United States Patent
Honda et al.

(10) Patent No.: US 6,579,185 B1
(45) Date of Patent: *Jun. 17, 2003

(54) PORTABLE ELECTRONIC DEVICE AND ENTERTAINMENT SYSTEM

(75) Inventors: Toshio Honda, Kanagawa (JP); Hideyoshi Asai, Kanagawa (JP)

(73) Assignee: Sony Computer Entertainment Inc., Co., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/402,390
(22) PCT Filed: Feb. 16, 1999
(86) PCT No.: PCT/JP99/00670
§ 371 (c)(1), (2), (4) Date: Oct. 6, 1999
(87) PCT Pub. No.: WO99/40985
PCT Pub. Date: Aug. 19, 1999

(30) Foreign Application Priority Data

Feb. 16, 1998 (JP) .......................................... 10-050158

(51) Int. Cl.[7] .............................................. G06F 17/00
(52) U.S. Cl. ...................................................... 463/43
(58) Field of Search ................................ 463/1, 30, 31, 463/35, 36, 37, 39, 40, 43, 44, 45–47

(56) References Cited

U.S. PATENT DOCUMENTS

| | | | | | |
|---|---|---|---|---|---|
| 5,428,528 A | * | 6/1995 | Takenouchi et al. | ......... | 364/410 |
| 5,668,591 A | * | 9/1997 | Shintani | ................. | 725/140 |
| 5,682,428 A | * | 10/1997 | Johnson | ................. | 380/23 |
| 5,722,069 A | * | 2/1998 | Donner | ................. | 455/418 |
| 5,854,694 A | * | 12/1998 | Payne et al. | ................. | 358/473 |
| 6,007,428 A | * | 12/1999 | Nishiumi et al. | ................. | 463/36 |

FOREIGN PATENT DOCUMENTS

| | | |
|---|---|---|
| EP | 0 631 247 A2 | 12/1994 |
| JP | 62-276683 | 12/1987 |
| JP | 2-54387 | 2/1990 |
| JP | 8-309032 | 11/1996 |
| JP | 9-22377 | 1/1997 |

OTHER PUBLICATIONS

Dabista Magazine vol. 2 1998.

* cited by examiner

Primary Examiner—Kim Nguyen
(74) Attorney, Agent, or Firm—Katten Muchin Zavis Rosenman

(57) ABSTRACT

A portable electronic device has a connector 42 for being connected to a master having a program executing function, microcomputer 41, which has a program memory 41a for storing a program, for controlling execution of the program, and a storage (not shown) for storing event occurrence, wherein an event that has been stored in the storage is transferred to the master in response to a request from the master.

5 Claims, 25 Drawing Sheets

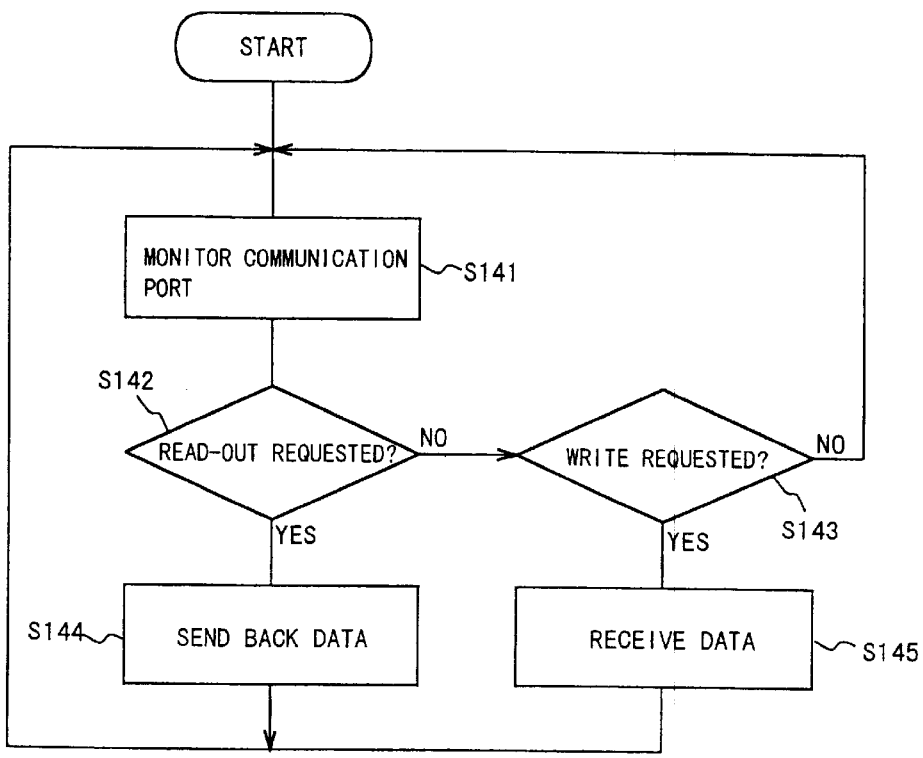
PRIOR ART  FIG. 21
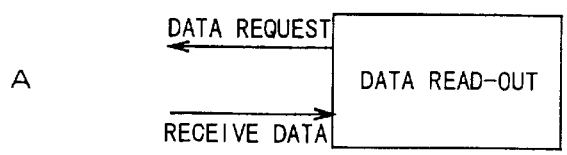
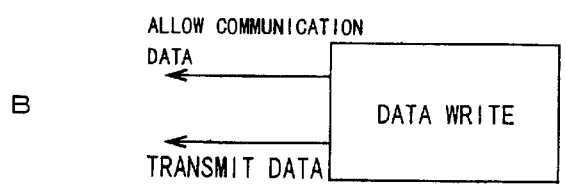
PRIOR ART  FIG. 22

PRIOR ART  FIG. 26

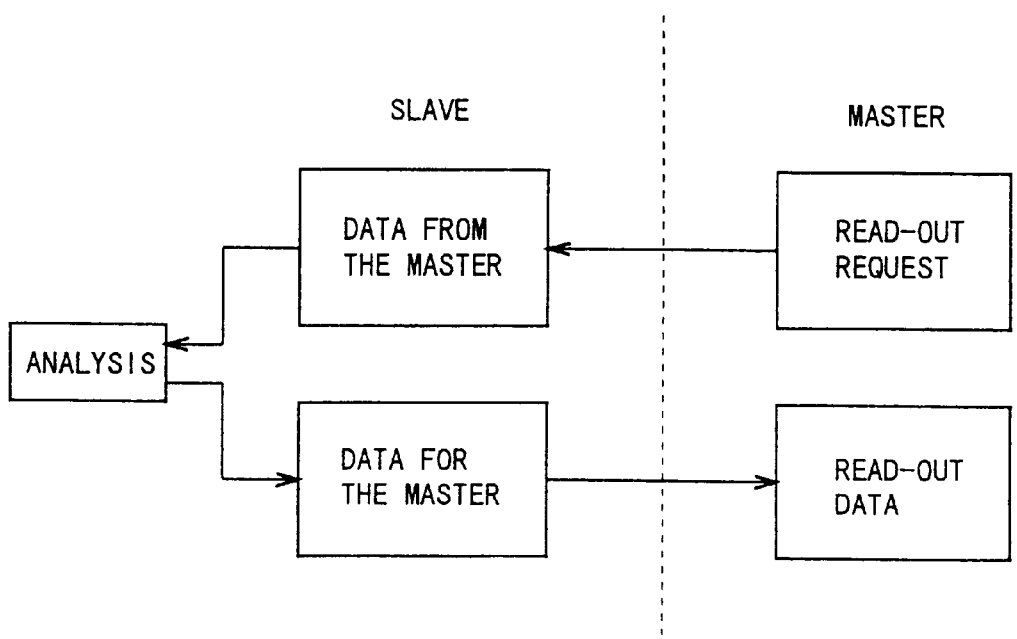
PRIOR ART *FIG. 28*

PORTABLE ELECTRONIC DEVICE AND ENTERTAINMENT SYSTEM

TECHNICAL FIELD

This invention relates to a portable electronic device used as an auxiliary storage device such as a memory card inserted into the master unit of information equipment, as well as an entertainment system such as a video game station having a function for storing game data or the like in an auxiliary storage device.

BACKGROUND ART

A portable electronic device or slave serving as an auxiliary storage device such as a conventional memory card used upon being inserted into the master of information equipment such as a video game machine is equipped with an interface for making a connection to the console (master) of the information equipment and a non-volatile storage element for storing data.

FIG. 26(a) illustrates an example of the arrangement of the principal components of a memory card, which is an example of such a portable electronic device according to the prior art. A memory card according to the prior art has control means 11 for controlling the operation of the memory card, a connector 12 for making a connection to a terminal provided in a slot of information equipment or the like, and a non-volatile memory 16 for storing data. The connector 12 and the non-volatile memory 16 are connected to the control means 11.

The control means 11 is constituted by a microcomputer, by way of example. A flash memory such as an EEPROM, for example, is used as the non-volatile memory 16. There are also instances where the interface for the connection to the information equipment or the like employs a microcomputer as control means for interpreting protocols.

FIG. 26(b) illustrates the items controlled by the control means 11 of the conventional memory card 10.

As illustrated, the memory card merely has a console connection interface for connection to the console of the information equipment or the like, and a memory interface for input and output of data to and from the non-volatile memory.

Further, the conventional video game station such as a TV game station for home use has a function for storing game data and the like in an auxiliary storage device. The above-mentioned video card is used also as an auxiliary storage device of such a video game station.

FIG. 27 illustrates an example of a conventional video game station that uses a memory card as an auxiliary storage device. This conventional video game station 1 has a console 2 accommodated within a substantially quadrangular case and is constituted by a centrally provided disk mounting unit 3 in which is mounted an optical disk serving as a recording medium on which the application program of a video game has been recorded, a reset switch 4 for resetting the game at will, a power-supply switch 5, a disk operating switch 6 manipulated for mounting the optical disk, and two slots 7A and 7B, by way of example.

The memory card 10 used as an auxiliary storage device is inserted into the slots 7A, 7B so that the results of a game, for example, that has been run on the video game station 1, are sent from control means (CPU) 19 and written to the non-volatile memory 16. An arrangement may also be adopted in which a plurality of control devices (controllers) (not shown) are connected to the slots 7A, 7B, thereby enabling a plurality of users to play competitive games against one another at the same time.

More specifically, between a master and a slave, as shown in FIG. 28, data from the master is analyzed on the side of the slave in response to a read-out request from the master. The results of analysis are sent to the master as data for the master and this data is treated as read-out data on the master side.

Consideration has been given to providing a slave, which is connected utilizing the memory-card slot of a video game station or the like serving as the master, not only with the storage function of an auxiliary storage device but also with a function for executing programs such as games. Such a slave can also be used as a portable electronic device as is, and by making it easy to communicate with other equipment, a wider range of applications can be achieved. This in turn can stimulate new demand.

The present invention, which has been devised in view of these circumstances, has as its object to provide a portable electronic device and an entertainment system, wherein the portable electronic device is capable of being connected to a master, can be used even as a stand-alone slave and that readily communicates with other items of equipment.

DISCLOSURE OF INVENTION

A portable electronic device according to the present invention is equipped with an interface for making a connection to a master having a program executing function, the portable electronic device comprising program storage means for storing a program, control means for controlling execution of the program, and storage means for storing event occurrence, wherein an event that has been stored in the storage means is transferred to the master in response to a request from the master.

Further, a portable electronic device according to the present invention is equipped with an interface for making a connection to a master having a program executing function, the portable electronic device comprising program storage means for storing a program, control means for controlling execution of the program, and conversion means for converting an address of the program, which has been stored in the program storage means, with respect to the control means, wherein the control means directly executes the program, whose address has been converted by the conversion means, stored in the program storage means.

Furthermore, a portable electronic device according to the present invention comprises an information processor capable of executing program data, storage means for storing program data that has been downloaded, address conversion means for acquiring position information of the program data in the storage means and, when the storage means has been accessed from the information processor, for addressing the storage means based upon pertinent access information, operating-information input means for inputting operating information to the information processor, and output means for outputting images and audio which the information processor has produced based upon at least the operating information input via the operating-information input means.

An entertainment system according to the present invention comprises a master having a program executing function and a slave equipped with an interface for making a connection to the master, wherein the master has control means for transferring information accompanying execution of the program to the slave and for reading in information from the slave, and the slave has program storage means for storing a program, control means for controlling execution of the program, and storage means for storing event occurrence, wherein an event that has been stored in said storage means is transferred to said master in response to a request from said master.

An entertainment system according to the present invention comprises a master having a program executing function and a slave equipped with an interface for making a connection to the master, wherein the master has control means for transferring information accompanying execution of the program to the slave and for reading in information from the slave, and the slave has program storage means for storing a program, control means for controlling execution of the program, and conversion means for converting an address of the program, which has been stored in the program storage means, with respect to the control means, wherein the control means directly executes the program, whose address has been converted by the conversion means, stored in the program storage means.

Thus, the present invention is such that when an event occurs in an internal device, the occurrence of the event is stored and then the event occurrence is communicated to the master in response to a request from the master. As a result, the origin of an operation is not only the master but can also be an internal device. In the present invention, therefore, the degree of freedom of slave operation is enhanced in relation to the master.

Further, the present invention can be executed directly without rearranging programs in memory. As a result, time required for rearrangement is eliminated in the present invention, thereby making it possible to execute processing at high speed.

BRIEF DESCRIPTION OF DRAWINGS

FIG. 21 is a flowchart illustrating a series of steps executed on the side of a slave according to the prior art;

FIG. 22 is a flowchart illustrating a series of steps executed on the side of a master according to the prior art;

FIG. 28 is a block diagram for describing mode of communication between a slave and a master according to the prior art.

BEST MODE FOR CARRYING OUT THE INVENTION

A preferred embodiment according to the present invention will now be described with reference to the drawings. A portable electronic device embodying the present invention can be used as a memory card employed in an entertainment system such as a video game station serving as the master. The portable electronic device can also be used separately as a hand-held game machine. It should be noted that the master is not limited to a video game station and that the portable electronic device serving as the slave need not necessarily have a memory card function.

In the description that follows, the present invention is described in regard to a video game station which is an example of a master in which a portable electronic device embodying the present invention is employed as a slave.

Figure 1:
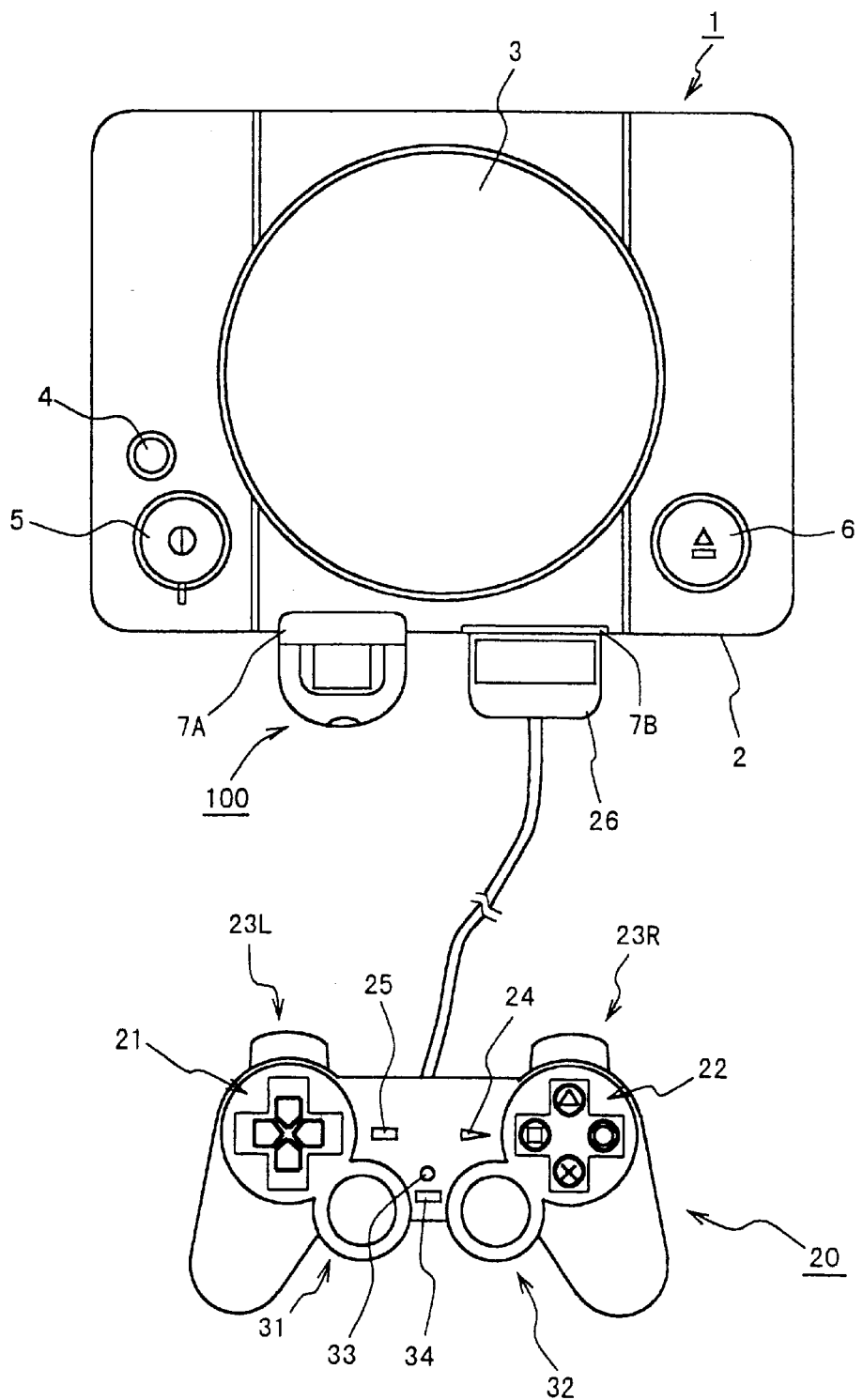
FIG. 1 is a plan view illustrating the appearance of a video game station serving as a master in which a portable electronic device is used as a slave according to an embodiment of the present invention.

FIG. 1 shows the appearance of a video game station serving as the master in which the electronic device embodying the present invention is inserted. The video game station 1 is for reading out a game program that has been recorded on an optical disk or the like and for executing the program in accordance with commands from a user (the player of the game). Executing the game primarily means causing the game to proceed and controlling video and audio that conform to the content of the game.

The video game station 1 has a console 2 accommodated within a substantially quadrangular case and is constituted by a centrally provided disk mounting unit 3 in which is mounted an optical disk such as a CD-ROM serving as a recording medium for supplying an application program of a video game or the like, a reset switch 4 for resetting the game at will, a power-supply switch 5, a disk operating switch 6 manipulated for mounting the optical disk, and two slots 7A and 7B, by way of example.

It should be noted that the recording medium for supplying the application program is not limited to an optical disk. Further, an arrangement may be adopted in which the application program is supplied via a communications line.

Two controllers 20 can be connected to the slots 7A, 7B so that two users can play competitive games or the like against each other. The above-mentioned memory card or the portable electronic device embodying the present invention can be inserted into the slots 7A, 7B. Though FIG. 1 exemplifies a structure provided with the slots 7A, 7B of two systems, the number thereof is not limited to two.

The controller 20 has first and second control portions 21, 22 as well as a left button 23L, a right button 23R, a start button 24 and a select button 25. The controller further has control portions 31, 32 capable of analog control, a mode selection switch 33 for selecting the operating mode of the control portions 31, 32, and a display portion 34 for displaying the selected operating mode. Provided within the controller 20 is a vibration imparting mechanism, which is not shown.

Figure 2:
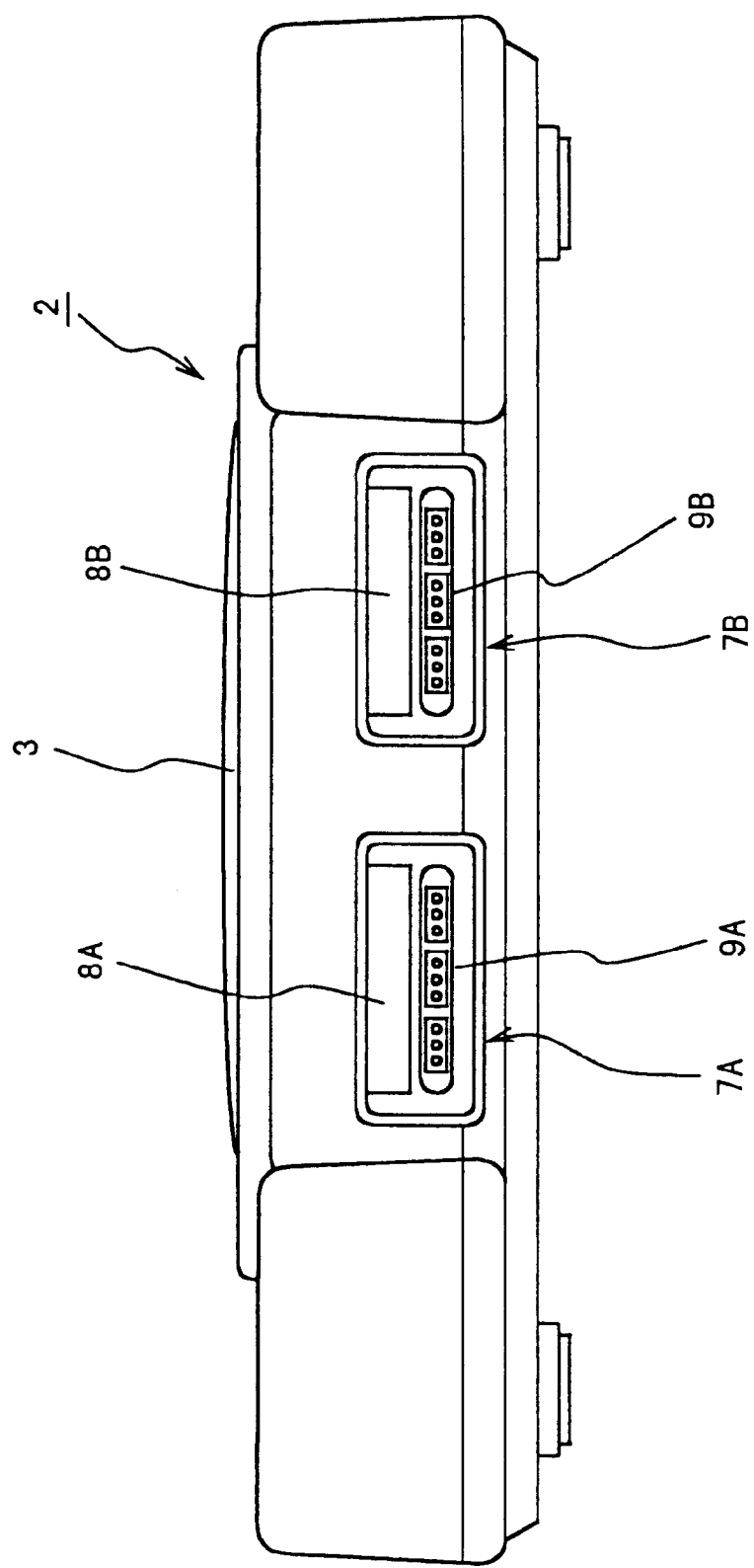
FIG. 2 is a back view showing the appearance of slots in the video game station serving as a master.

FIG. 2 shows the appearance of the slots 7A, 7B provided in the front side of the console 2 of video game station 1.

According to this embodiment, the slots 7A, 7B are each formed to have two levels. The upper levels of the respective slots are provided with memory card insertion portions 8A, 8B for inserting the above-mentioned memory card 10 or a portable electronic device 100, described later, and the lower levels of the respective slots are provided with controller connecting portions (jacks) 9A, 9B for connecting a connection terminal (connector) 26 of the controller 20.

Structurally, the insertion hole (slot) of each of the memory card insertion portions 8A, 8B is formed to have a transversely elongated rectangular shape, and the corners at both ends on the lower side thereof are made rounder than the corners at both ends on the upper side so that a memory card will not be inserted in the wrong direction. The memory card insertion portions 8A, 8B are provided with shutters which protect the connection terminals provided within the memory card insertion portions for the purpose of obtaining an electrical connection.

Structurally, the controller connecting portions 9A, 9B, on the other hand, each have an insertion hole of a transversely elongated rectangular shape, and the corners at both ends on the lower side thereof are made rounder than the corners at both ends on the upper side, whereby the connection terminal 26 of the controller 20 will not be connected in the wrong direction. The memory card insertion portions 8A, 8B are structured to have insertion holes of different shapes in such a manner that a memory card will not be inserted by mistake.

Figure 3:
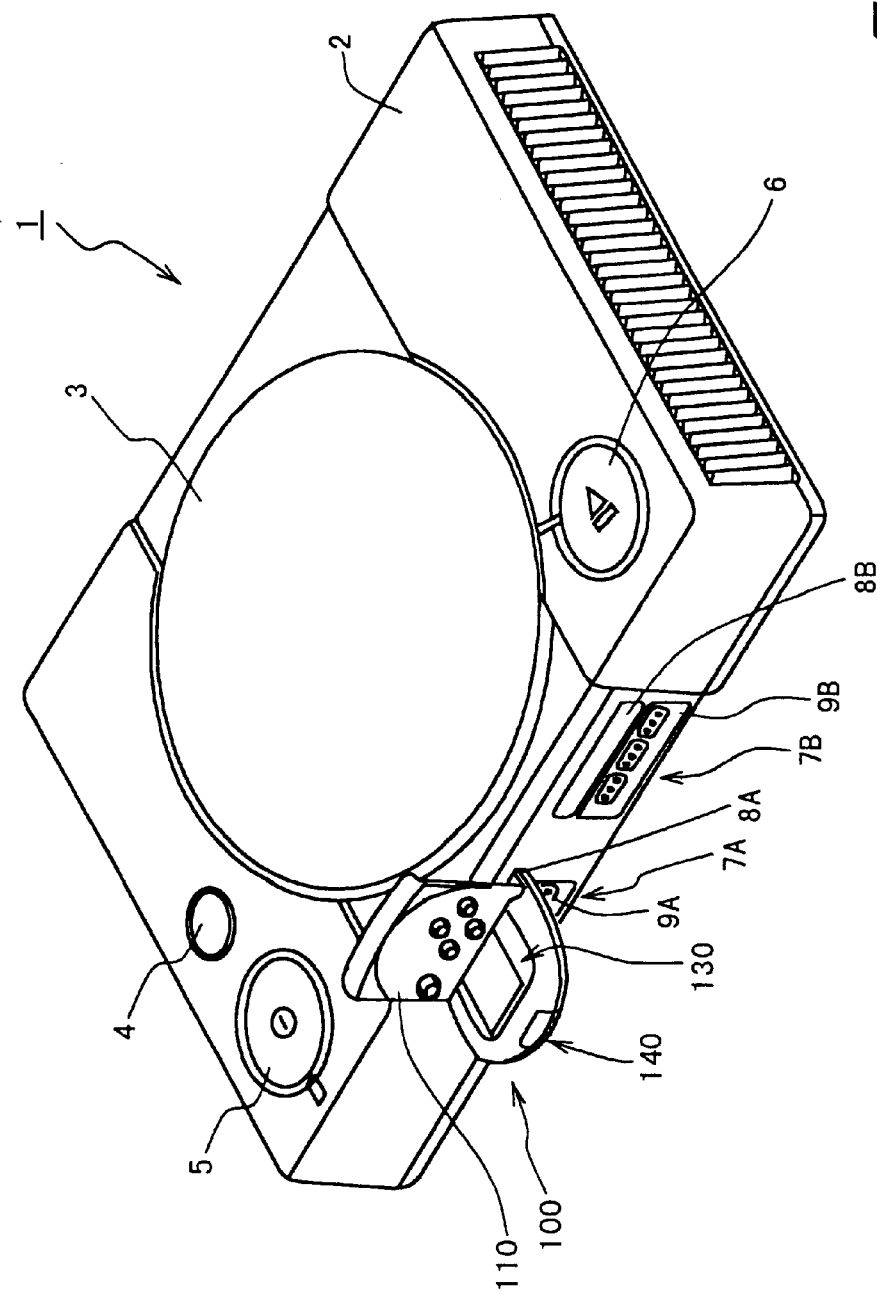
FIG. 3 is an external perspective view showing the appearance of the video game station serving as a master.

FIG. 3 shows a state in which the portable electronic device 100 (described later) embodying the present invention has been inserted into the memory card insertion portion 8A of slot 7A in the front side of the video game station 1.

Figure 4:
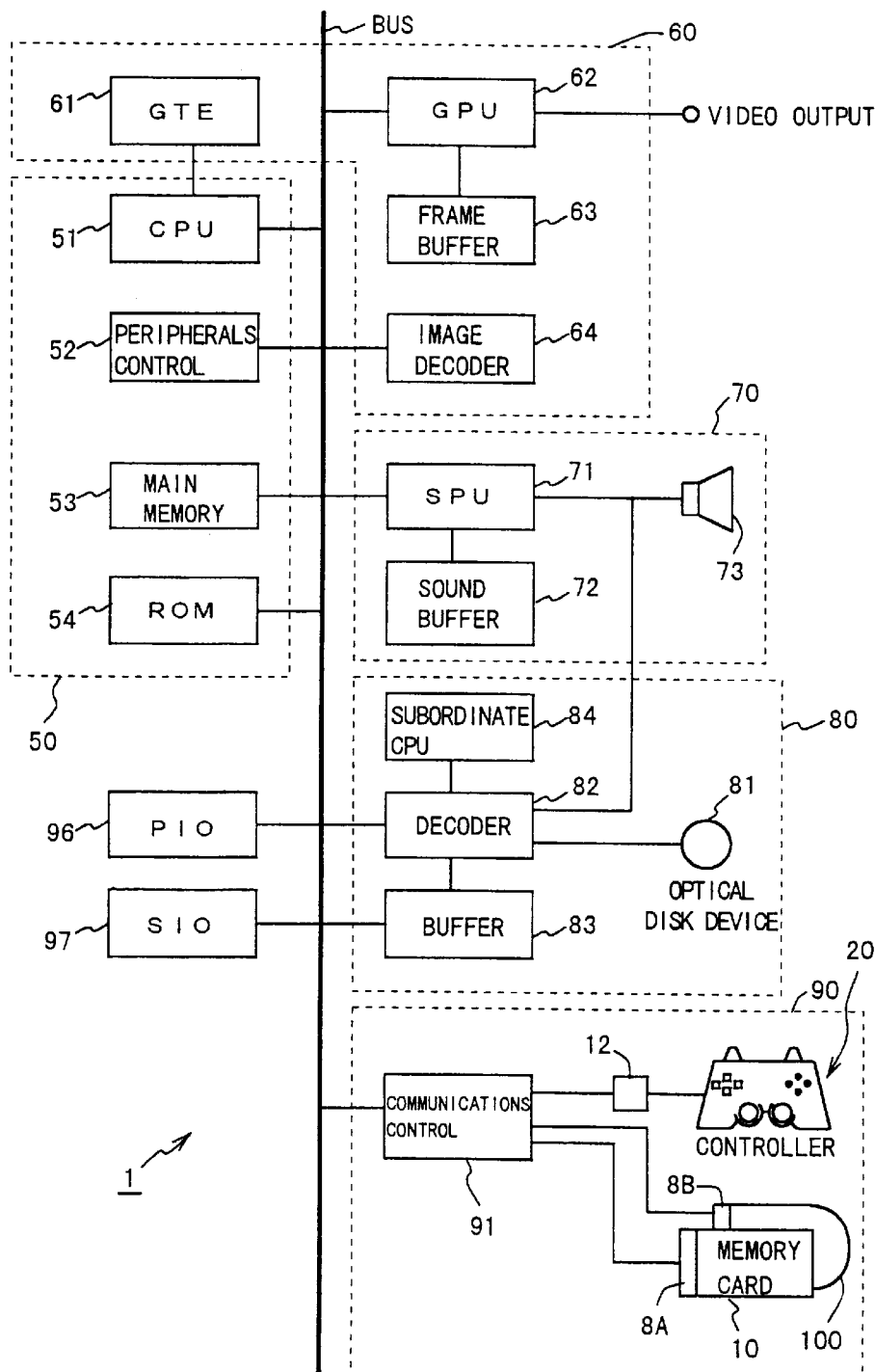
FIG. 4 is a block diagram illustrating a specific example of the arrangement of the principal components of the video game station serving as a master.

FIG. 4 is a block diagram showing schematically an example of the circuitry of the principal components of the above-described video game station 1.

The video game station 1 has a control system 50 comprising a central processing unit (CPU) 51 and its peripherals; a graphics system 60 comprising a graphic processing unit (GPU) 62, etc., for drawing graphics in a frame buffer 63; a sound system 70 comprising a sound processing unit (SPU) 71, etc., for generating music and sound effects, etc.; an optical-disk controller 80 for controlling an optical disk on which an application program has been recorded; a communications controller 90 for controlling input and output of data to and from the memory card 10, which stores signals and game settings from the controller 20 to which commands from the user are input, or portable electronic device 100, described later; and a bus denoted BUS to which each of the foregoing components is connected.

The control system 50 has the CPU 51, a peripherals controller 52 for performing control such as interrupt control and control of direct memory access (DMA) transfer, a main memory 53 comprising a random-access memory (RAM); and a read-only memory (ROM) 54 storing a program such as a so-called operating system that controls the main memory 53, graphic system 60 and sound system 70. The main memory mentioned here refers to a memory in which programs can be executed.

The CPU 51, which performs overall control of the video game station 1 by executing the operating system that has been stored in the ROM 54, is constituted by a 32-bit RISC-CPU, by way of example.

When power is introduced to this video game station 1, the CPU 51 of the control system 50 runs the operating system stored in the ROM 54, whereby the CPU 51 controls the graphics system 60 and sound system 70, etc. Further, when the operating system is run, the CPU 51 performs initialization of the overall video game station 1, such as verification of the operation thereof, and then controls the optical-disk controller 80 to execute an application program such as a game that has been recorded on an optical disk. In response to execution of a program, such as a game, the CPU 51 controls the graphics system 60 and sound system 70, etc., in conformity with inputs from the controller 20, thereby controlling the display of images and the generation of sound effects and music.

The graphics system 60 has a geometry transfer engine (GTE) 61 for executing coordinate transformation and the like, the GPU 62 for drawing graphics in accordance with a draw command from the CPU 51, a frame buffer 63 for storing an image drawn by the GPU 62, and an image decoder 64 for decoding image data that has been compressed and encoded by an orthogonal transformation such as a discrete cosine transformation.

The GTE 61, which has a parallel operation mechanism for executing a plurality of arithmetic operations in parallel, is capable of executing a coordinate transformation, light-source calculation and matrix or vector operation, etc., at high speed in response to an operation request from the CPU 51. More specifically, in case of a calculation where one polygon of a triangular shape is subjected to flat shading so as to be rendered in the same color, the GTE 61 is capable of calculating the coordinates of a maximum of 1,500,000 polygons in one second. As a result, the video game station is capable of reducing the load upon the CPU 51 and of calculating coordinates at high speed.

The GPU 62 draws polygons and the like in the frame buffer 63 in accordance with a draw command from the CPU 51. The GPU 62 is capable of drawing a maximum of 360,000 polygons in one second.

The frame buffer 63, which comprises a so-called dual-port RAM, is capable of performing simultaneously the transfer of draw data from the GPU 62 or main memory and read-out for displaying what has been drawn. The frame buffer 63, which has a capacity of 1 MB, is treated as a 16-bit matrix composed of 1024 pixels in the horizontal direction and 512 pixels in the vertical direction. Further, besides a display area from which data is output as video, the frame buffer 63 is provided with a CLUT area in which is stored a color look-up table (CLUT) to which reference is had when the GPU 62 draws polygons or the like, and a texture area, in which is stored texture subjected to a coordinate transformation at the time of drawing and then inserted into (mapped to) polygons drawn by the GPU 62. The CLUT area and texture area change dynamically in accordance with a change, etc., in the display area.

Besides performing the flat shading mentioned above, the GPU 62 is capable of executing Gouraud shading, which decides the color in a polygon by interpolation from the colors at the apices of the polygon, and texture mapping, in which texture that has been stored in the texture area is mapped to polygons. In a case where Gouraud shading or texture mapping is carried out, the GTE 61 is capable of calculating the coordinates of a maximum of 500,000 polygons in one second.

Furthermore, under control of the CPU 51, the image decoder 64 decodes image data representing still or moving images stored in the main memory 53, and stores the decoded data in the main memory 53.

The image data thus reproduced is stored in the frame buffer 63 via the GPU 62, whereby the image data is capable of being used as the background of the image drawn by the GPU 62.

The sound system 70 has an SPU 71 for generating music and sound effects based upon a command from the CPU 51, a sound buffer 72 in which data such as waveform data is stored by the SPU 71, and a speaker 73 for outputting music and sound effects, etc., generated by the SPU 71.

The SPU 71 has an ADPCM decoding function for reproducing audio data obtained by adaptive differential PCM (ADPCM) using 16-bit audio data as a 4-bit differential signal, a reproducing function for generating sound effects and the like by reproducing waveform data that has been stored in the sound buffer 72, and a modulating function for modulating and reproducing the waveform data that has been recorded in the sound buffer 72.

Provision of these functions enables the sound system 70 to be used as a so-called sampling sound source, which generates music and sound effects, based upon the waveform data recorded in the sound buffer 72, in response to a command from the CPU 51.

The optical-disk controller 80 has an optical disk device 81 for reproducing programs, data and the like that have been recorded on an optical disk, a decoder 82 for decoding programs, data and the like that have been recorded following assignment of, e.g., error correction codes (ECC) thereto, and a buffer 83 in which data from the optical disk device 81 is stored temporarily, thereby speeding up the read-out of data from the optical disk. A subordinate CPU 84 is connected to the decoder 82.

In addition to ADPCM data, so-called PCM data, which is the result of subjecting an audio signal to an analog-to-digital conversion, is an example of audio data recorded on the optical disk and read out by the optical disk device 81.

As for ADPCM data, audio data that has been recorded using four bits to express, e.g., a 16-bit digital data differential is decoded by the decoder 82, after which the decoded data is supplied to the SPU 71. Here the data is subjected to processing such as a digital/analog conversion and then is used to drive the speaker 73.

As for PCM data, audio data that has been recorded as, e.g., 16-bit digital data is decoded by the decoder 82 and is then output to the speaker 73.

The communications controller 90 has a communications controller 91 for controlling communication with the CPU 51 via the bus denoted BUS. The communications controller 91 is provided with controller connecting portions 9A, 9B, to which the controller 20 for entering commands from the user is connected, and with memory card insertion portions 8A, 8B, to which is connected the memory card 10 or portable electronic device 100, described later, serving as an auxiliary storage device for storing game settings data and the like.

The controller 20 connected to the controller connecting portions 9A, 9B has, say, 16 instruction keys in order that the user may enter commands. In accordance with a command from the communications controller 91, the controller 20 transmits the states of these instruction keys to the communications controller 91 at a cycle of 60 times per second by synchronous communication. The communications controller 91 transmits the states of the instruction keys of controller 20 to the CPU 51.

As a result, the command from the user is input to the CPU 51 which, on the basis of the game program, etc., currently being run, executes processing that is in accordance with the command from the user.

It is required that a large quantity of image data be transferred at high speed when program read-out, image display and drawing of graphics, etc., are executed among the main memory 53, GPU 62, image decoder 64 and decoder 82. Accordingly, the video game station is so adapted that so-called DMA transfer can be carried out for direct transfer of data among the main memory 53, GPU 62, image decoder 64 and decoder 82 by control from the peripherals controller 52 without the intervention of the CPU 51. As a result, the load on the CPU 51 that accompanies data transfer can be alleviated and high-speed data transfer can be performed.

When it is necessary to store setup data of a game currently being run, the CPU 51 transmits the data that is to be stored to the communications controller 91. Upon receiving the data sent from the CPU 51, the communications controller 91 writes the data to the memory card 10 or portable electronic device 100 that has been inserted into the slot of memory card insertion portion 8A or 8B.

It should be noted that the communications controller 91 has a built-in protection circuit to prevent electrical destruction. The memory card 10 and portable electronic device 100, which are separate from the bus denoted BUS, can be inserted and extracted in a state in which the game station console is being supplied with power. In situations where the storage capacity of the memory card 10 or portable electronic device 100 is no longer adequate, therefore, a new memory card can be inserted without cutting off power to the console. As a result, game data requiring power back-up will not be lost; a new memory card can be inserted and the necessary data can be written to the new memory card.

A parallel I/O interface (PIO) 96 and a serial I/O interface (SIO) 97 are interfaces for connecting the memory card 10 and portable electronic device 100 to the video game station 1.

The portable electronic device embodying the present invention will be described next. It is assumed below that the portable electronic device 100 according to the present invention is used as a slave upon being inserted into the above-described video game station 1 serving as the master.

The portable electronic device 100 serving as the slave is inserted into either of the memory card insertion portions 8A, 8B provided in the slots 7A, 7B, respectively, of the video game station 1 serving as the master. Portable electronic devices can be used also as unique memory cards corresponding to a plurality of connected controllers 20. For example, in an instance where two users (game players) play the game, the two portable electronic devices 100 function so that the game results of the individual users are recorded on respective ones of the two portable electronic devices.

The connector of the memory card 10 or portable electronic device 100 is so adapted that the conductor of the connection terminal for the power supply or for ground is formed to be longer than the other terminals in such a manner that the power-supply terminal or ground terminal will form an electrical connection first when the memory card 10 or portable electronic device 100 is inserted into the memory card insertion portions 8A, 8B. This is to ensure the safety and stability of electrical operation. An arrangement may be adopted in which the connection conductors of the memory card insertion portions 8A, 8B provided in the video game station 1 are formed to be longer, or in which both of the conductors are formed to be longer. Further, the connector portions are formed to have left/right asymmetry in order to prevent erroneous insertion.

Figure 5:
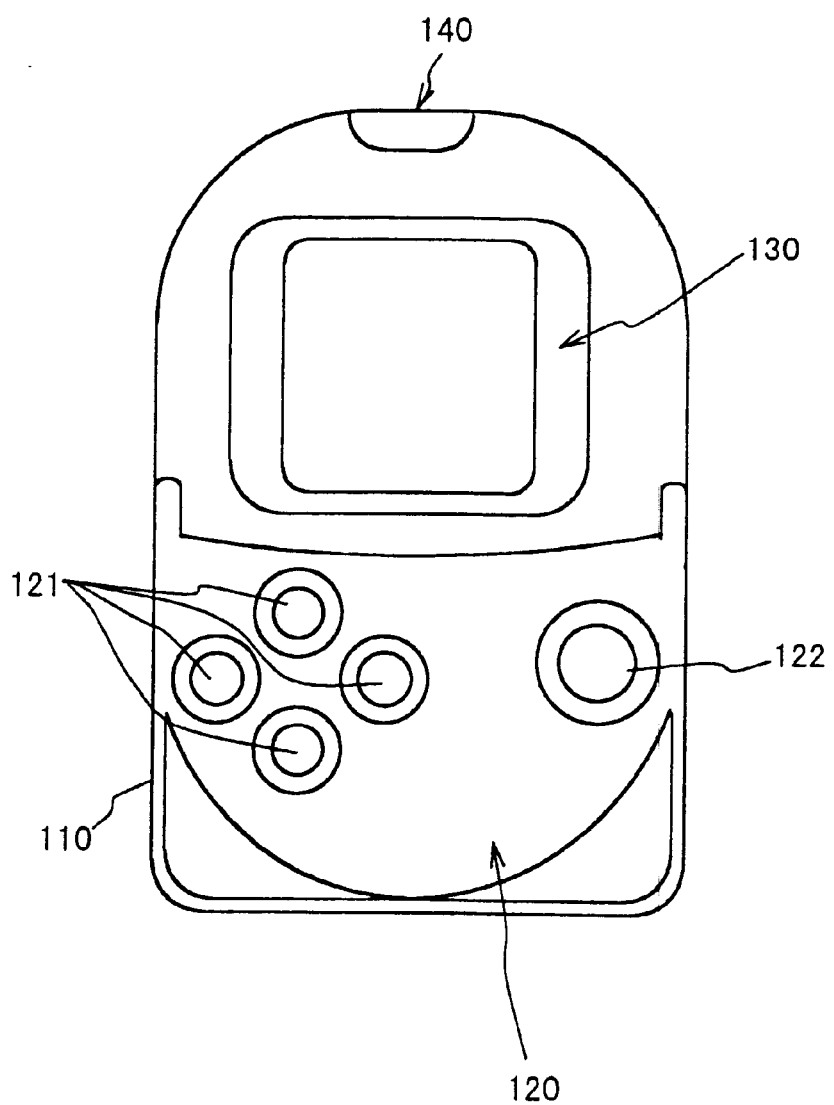
FIG. 5 is a plan view illustrating the appearance of an embodiment of portable electronic device according to the present invention.
Figure 6:
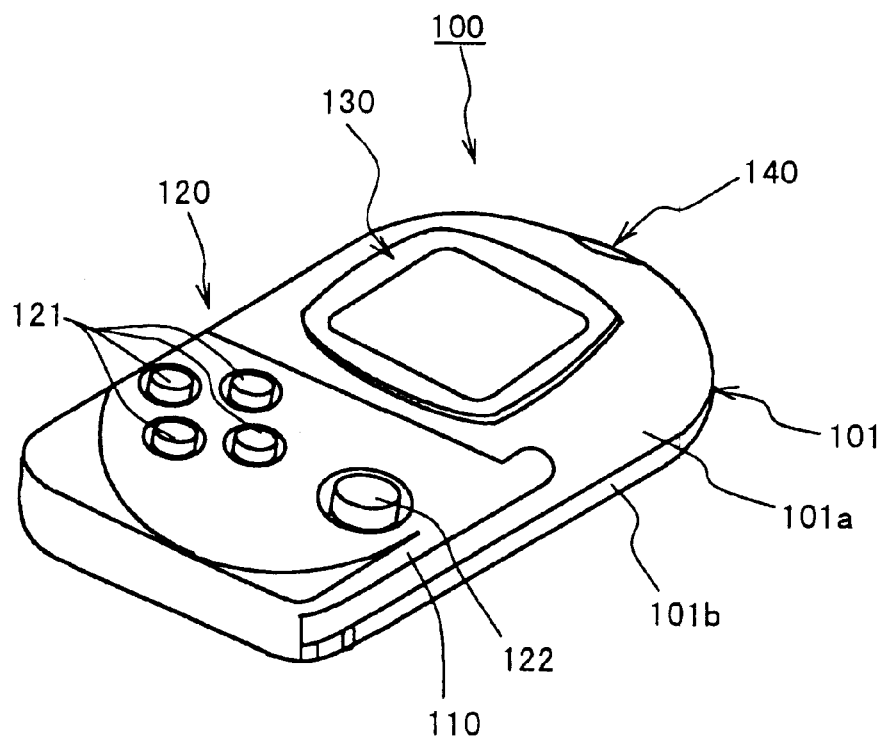
FIG. 6 is a perspective view showing the appearance of the embodiment of portable electronic device according to the present invention.
Figure 7:
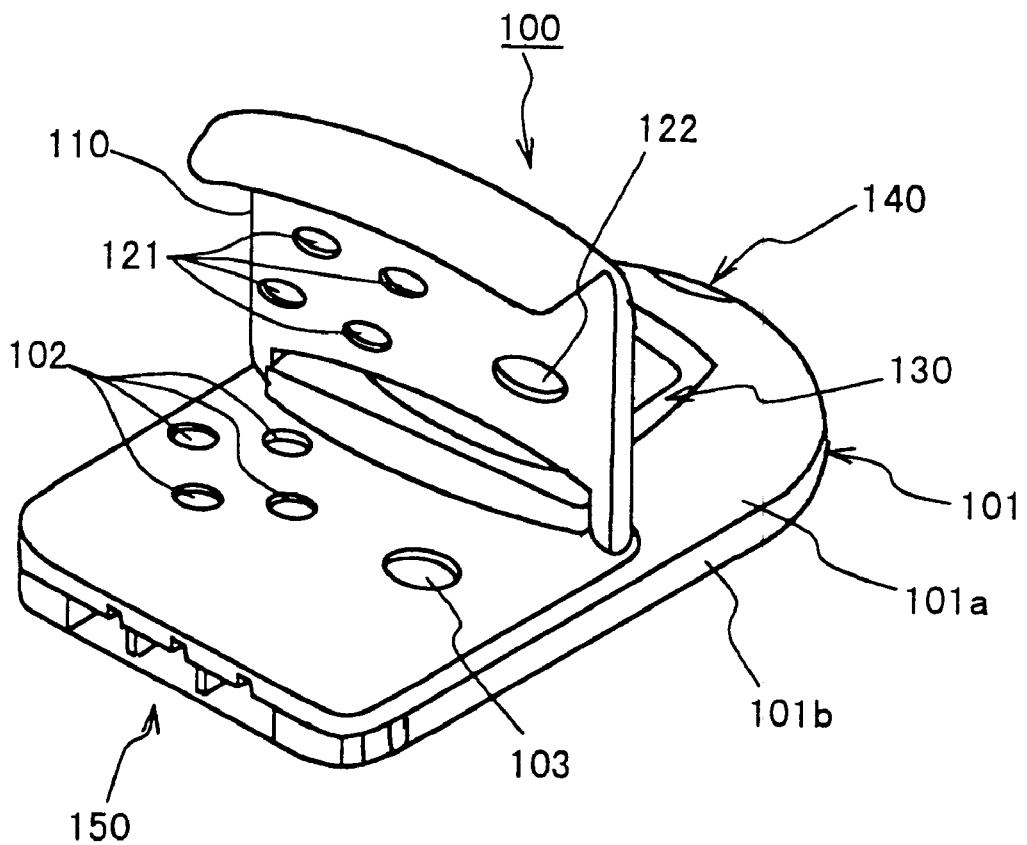
FIG. 7 is a perspective view showing a cover member in the opened state in the embodiment of the portable electronic device according to the present invention.

FIGS. 5 to 7 illustrate the appearance of the portable electronic device 100 embodying the present invention, in which FIG. 5 is a plan view of the portable electronic device 100, FIG. 6 a perspective view in which a cover member 110 for protecting the connector portion is shown in the closed state, and FIG. 7 a perspective view showing the cover member 110 in the open state.

As shown in FIGS. 5 to 7, the portable electronic device 100 according to the present invention has a housing 101. The housing 101 is provided with an operating section 120 having one or a plurality of operating elements 121, 122 for entering events and making various selections, a display section 130 comprising a liquid crystal display device (LCD), and a window 140 for performing wireless communication, as by infrared, by wireless communications means, described later.

The housing 101 comprises an upper shell 101a and a lower shell 101b and houses a substrate 151 mounting memory devices and the like. The housing 101 is capable of being inserted into the slots 7A, 7B in the console of the video game station 1. The base end of the housing has a side face provided with a connector portion 150 formed to have a rectangular-shaped opening.

The window 140 is provided in the generally semi-circular other end of the housing 101. The display section 130 is provided at a position in the vicinity of the window 140 on the top side of the housing 101 and occupies an area that is approximately half of the top side. The operating section 120 is provided at a portion opposite the window 140 on the top side of the housing 101 and occupies an area that is approximately half of the top surface. The operating section 120 has a substantially quadrangular shape and is constituted by a cover member 110, which is pivotally supported on the housing 101 and has one or plurality of operating elements 121, 122, and switch pushers 102, 103 provided at a position opened and closed by the cover member 110 on housing 101.

The operating elements 121, 122 are disposed passing through the cover member 110 from its upper to its lower side. The operating elements 121, 122 are supported on the cover member 110 in such fashion as to be movable in a direction in which they recede from the top side of the cover member 110.

The switch pushers 102, 103 have pushing elements supported on the housing 101 in such fashion as to be movable in a direction in which they recede from the top side of the cover housing 101. By pushing the pushing elements from above, push switches such as diaphragm switches disposed on the substrate 151 in the housing 101 are pushed.

The switch pushers 102, 103 are provided at positions corresponding to the positions of the operating elements 121, 122 when the cover member 110 is closed. More specifically, when the operating elements 121, 122 are pushed from above in a direction in which they recede from the top side of the cover member 110 in the closed state, the operating elements 121, 122 push the corresponding push switches in the housing 101 via the pushing elements of the corresponding switch pushers 102, 103.

Figure 8:
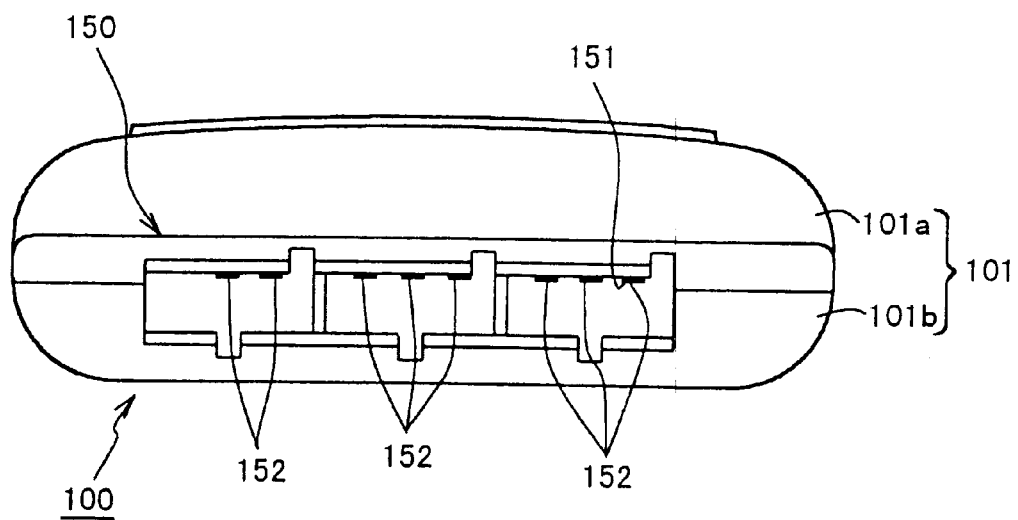
FIG. 8 is a front view showing the appearance of an embodiment of the portable electronic device according to the present invention.

As shown in FIG. 8, power and signal terminals 152 are disposed on the substrate 151 within the window of the connector portion 150.

The shape, dimensions, etc. of the connector portion 150 are common with those of the ordinary memory card 10 used with the video game station 1.

FIG. 9(a) is a block diagram showing an example of the arrangement of the principal components of the portable electronic device.

In a manner similar to the ordinary memory card 10 described above, the portable electronic device 100 has control means 41 for controlling its operation, a connector 42 for effecting a connection to a slot of information equipment or the like, and a non-volatile memory 46 serving as a device for storing data.

The control means 41, which is constituted by, say, a microcomputer, has an internally provided program memory 41a. A semiconductor memory device in which the state of recorded data remains intact even when power is cut off, as in the manner of a flash memory, is used as the non-volatile memory 46. It should be noted that the because the portable electronic device 100 according to the present invention is configured to be equipped with a battery 49, as will be described later, a static random-access memory (SRAM) capable of high-speed input/output of data can be used as the non-volatile memory 46.

The portable electronic device 100 differs in that, in addition to the components mentioned above, it has operation (event) input means 43 such as operating buttons for operating a stored program, display means 44 such as a liquid crystal display device (LCD) serving as display means for displaying various information in conformity with the above-mentioned program, wireless communications means 48 for sending data to and receiving data from another memory card or the like by infrared radiation, and a battery 49 for powering each of the foregoing components.

The portable electronic device 100 internally accommodates a miniature battery 49 as power supply means. This means that the portable electronic device is capable of operating independently even if it has been pulled out of the slots 7A, 7B of the video game station 1 constituting the master. A rechargeable secondary cell may be used as the battery 49. It is so arranged that power is supplied from the video game station 1 serving as the master when the portable electronic device 100 serving as the slave has been inserted into either of the slots 7A, 7B of the video game station 1 serving as the master. That is, a power-supply terminal 50 is connected to the connection terminal of the battery 49 via a diode 51 for preventing reverse current. When the portable electronic device has been connected by insertion into the slot of the master, such as the video game station 1, power is supplied from the master to the slave. Furthermore, in a case where a secondary cell is being used, charging of the secondary cell also takes place.

The portable electronic device 100 further includes a clock 45 and a speaker 47, which serves as sound generating means for generating sound in conformity with the program. It should be noted that the above-mentioned components are all connected to the control means 41 and operate in accordance with control exercised by the control means 41.

Figure 9:
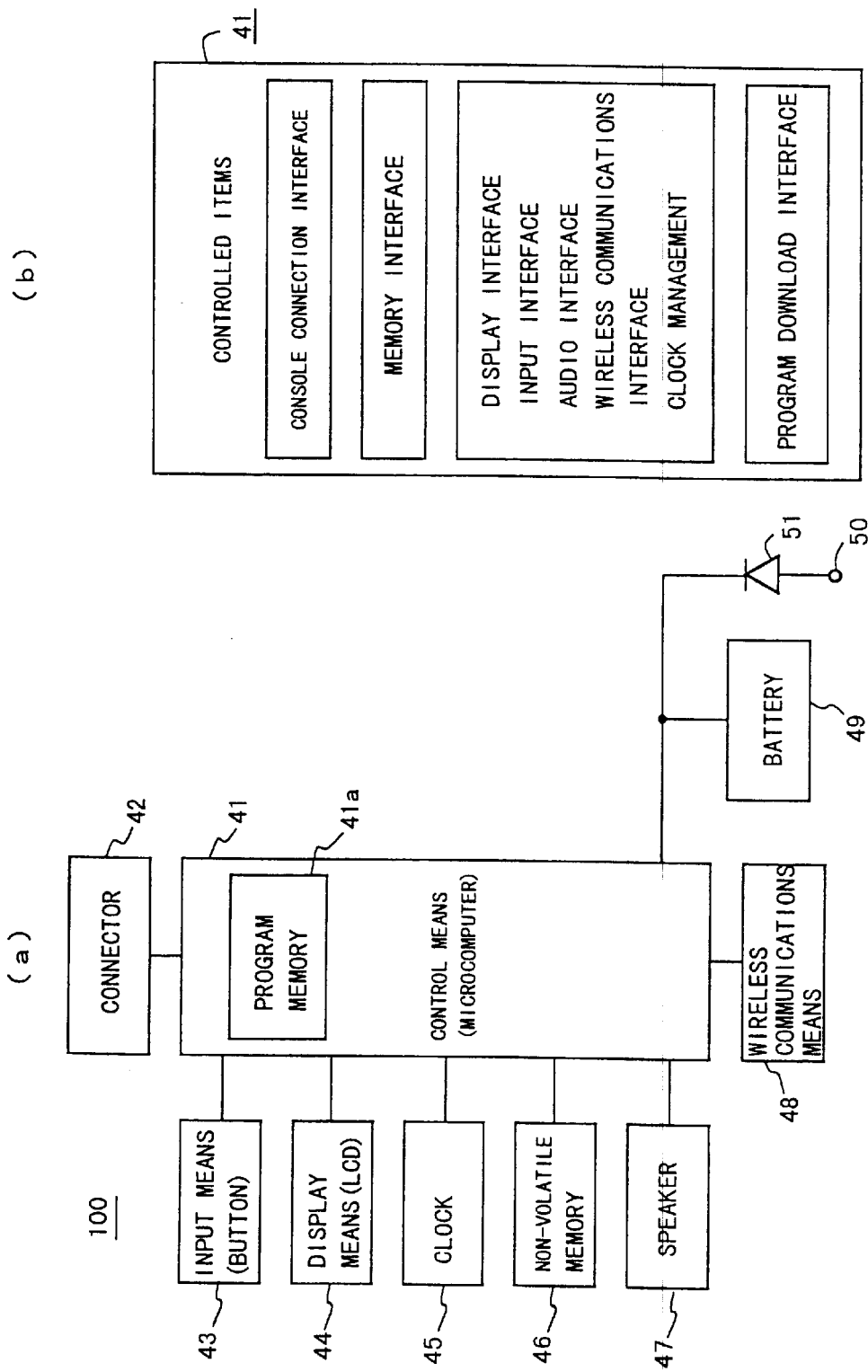
FIG. 9 is a block diagram showing an example of the arrangement of the principal components of the embodiment of the portable electronic device according to the present invention.

FIG. 9(*b*) illustrates the items controlled by the control means 41. Though the only interfaces with which the ordinary memory card 10 is equipped are the interface for the connection to the console of the information equipment and the memory interface for input/output of data with respect to memory, the portable electronic device 100 of this embodiment has, in addition to these interfaces, a display interface, an operation-input interface, an audio interface, a wireless communications interface, a clock interface and a program-download interface.

Thus, the interfaces (drivers) for managing the functions added on by the present embodiment are provided in the control means (microcomputer) 41 independently of the console (master) connection interface and independently of non-volatile memory management, which are the conventional functions. For this reason compatibility with the conventional functions can be maintained.

Further, since the portable electronic device 100 has the input means 43, such as a button switch, for operating an executed program, and the display means 44 using the liquid crystal display device (LCD) or the like, the portable electronic device 100 is capable of being used as a hand-held game machine for running a game application.

Moreover, since the portable electronic device 100 possesses a function for storing application programs, which are downloaded from the console of the video game station 1, in the program memory 41*a* in microcomputer 14, application programs can be run on the portable electronic device 100. The stored application programs and various types of driver software can be altered with facility.

The portable electronic device 100 according to this embodiment can be controlled independently of the video game station 1, as described above. On the side of the portable electronic device 100, therefore, data based upon an application program that has been stored in the program memory 41*a* serving as the program storage means can be created independently of the application software on the side of the video game station 1. By exchanging this data with the video game station 1, the portable electronic device 100 and the video game station 1 are capable of cooperative (linked) operation.

Furthermore, the fact that the portable electronic device 100 is equipped with the clock 45 makes it possible for time data to be shared with the video game station 1. In other words, not only is mutual time data made to coincide but both the video game station and the portable electronic device also share data that is for controlling, in real time, the progress of games that are run on them independently.

A specific example of the cooperative operation between the video game station 1 and portable electronic device 100 will be described later.

Figure 10:
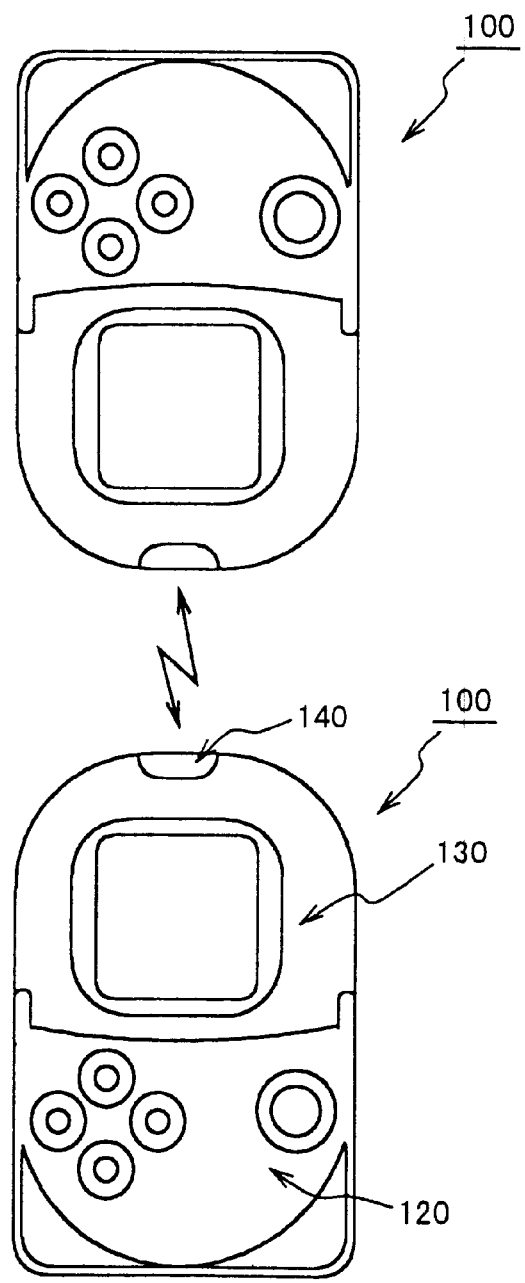
FIG. 10 is a diagram useful in describing a wireless communication function of the embodiment of the portable electronic device according to the present invention.

FIG. 10 illustrates schematically the manner in which wireless communication is performed between a portable electronic devices 100 according to the present invention By thus utilizing the wireless communications means 48, the portable electronic device 100 can exchange internal data with a plurality of memory cards by sending and receiving data via the window 140, which is a wireless communication window for performing wireless communication by infrared or the like. The internal data includes also data that has been transferred from the side of information equipment, such as the video game station, and stored in storage means within a memory card.

In the embodiment set forth above, the portable electronic device 100 is described as being used as the auxiliary storage device of a video game station. However, the object of application is not limited to a video game station, and the device is of course applicable to, e.g., the retrieval of various information.

The invention will now be described in regard to cooperative operation between the portable electronic device 100 and the video game station 1 serving as the master.

As mentioned above, the portable electronic device 100 and the console of video game station 1 can share game data generated by the microcomputer 41 serving as control means, time data obtained by the clock 45 in the memory card, and data generated by another memory card and obtained via the wireless communications means 48, etc.

Figure 11:
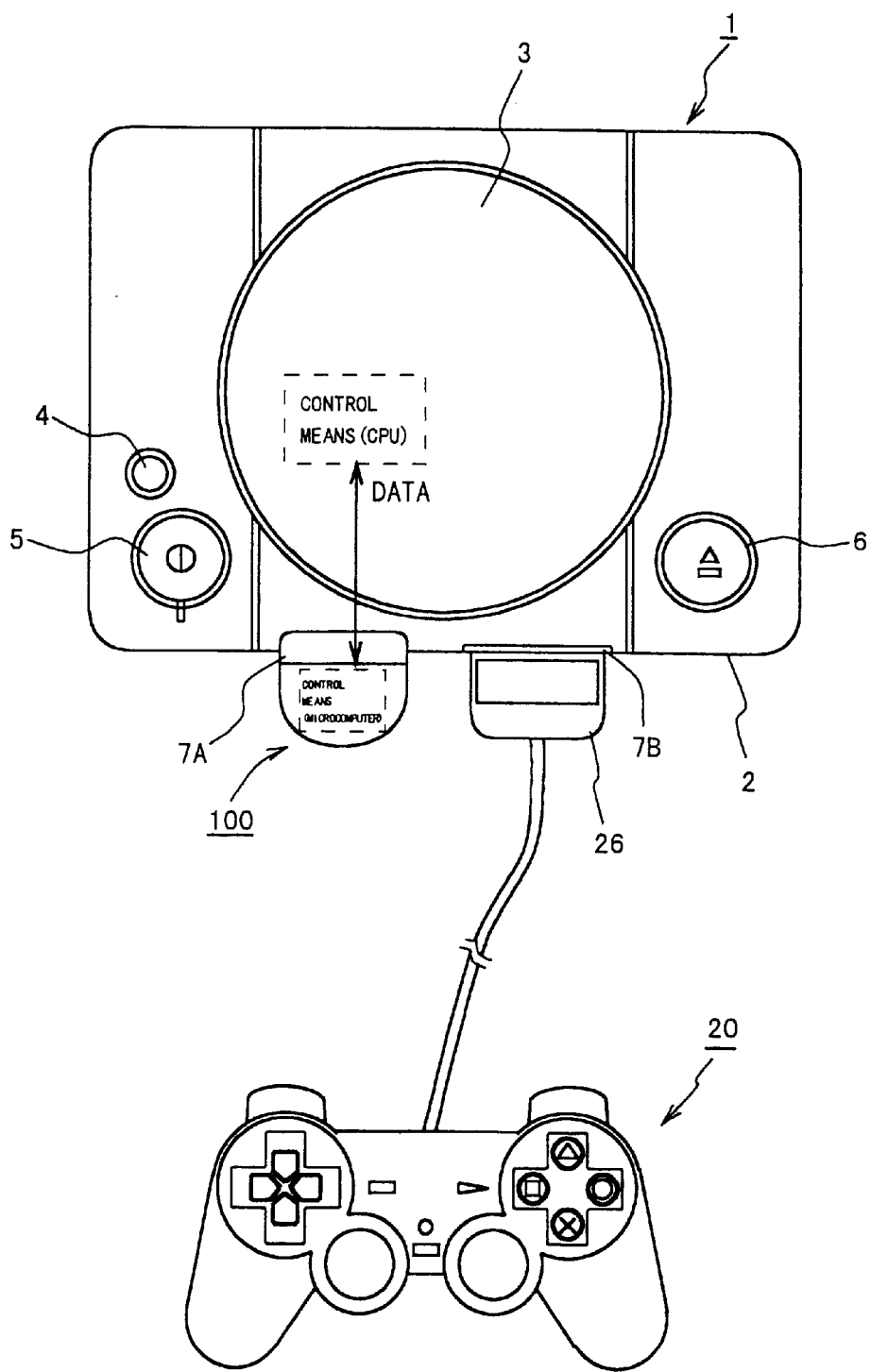
FIG. 11 is a diagram useful in describing cooperative operation between a slave which is an embodiment of the portable electronic device according to the present invention and the console of the video game station serving as the master.

FIG. 11 illustrates schematically the manner in which the video game station 1 serving as the master and the portable electronic device 100 serving as the slave perform a cooperative operation.

Described below as an example of such cooperative operation is a case where an optical disk (CD-ROM), which is a recording medium on which an application software program has been recorded, has been loaded in the video game station 1 serving as the master, and the program read out of the disk is downloaded to the portable electronic device 100 serving as the slave inserted into either of the slots 7A, 7B of the console of the video game station 1.

Downloading of a program on the assumption that it is for performing a cooperative operation will be discussed before giving a specific description regarding the cooperative operation.

Figure 12:
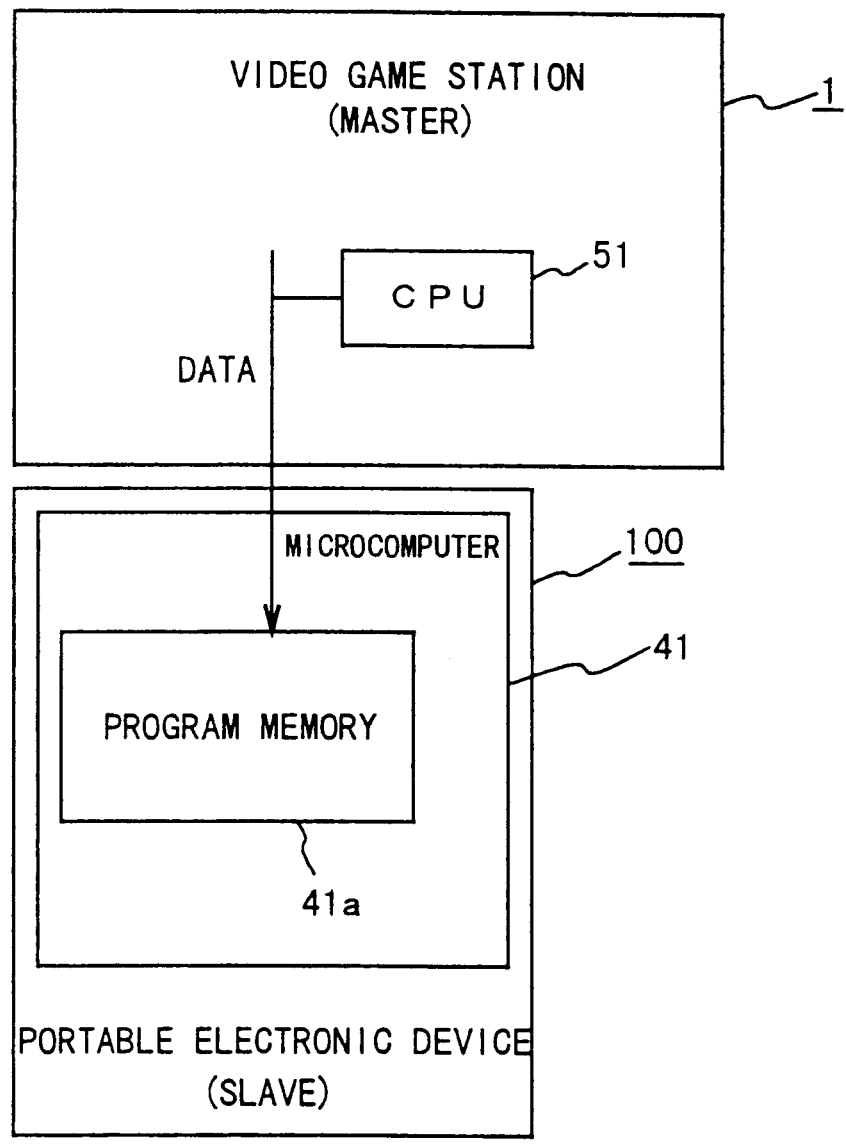
FIG. 12 is a diagram showing the flow of program data downloaded from the video game station console (master) to the portable electronic device (slave)

FIG. 12 illustrates the flow of data in an instance where the application program of a video game supplied from an optical disk (CD-ROM), etc., mounted on the disk mounting unit 3 of the master video game station 1 is transferred directly (downloaded) to the program memory 41*a* serving as program storage means in the microcomputer 41, which is the control means of the portable electronic device 100 serving as the slave, via the control means (CPU) 51 of video game station 1.

Figure 13:
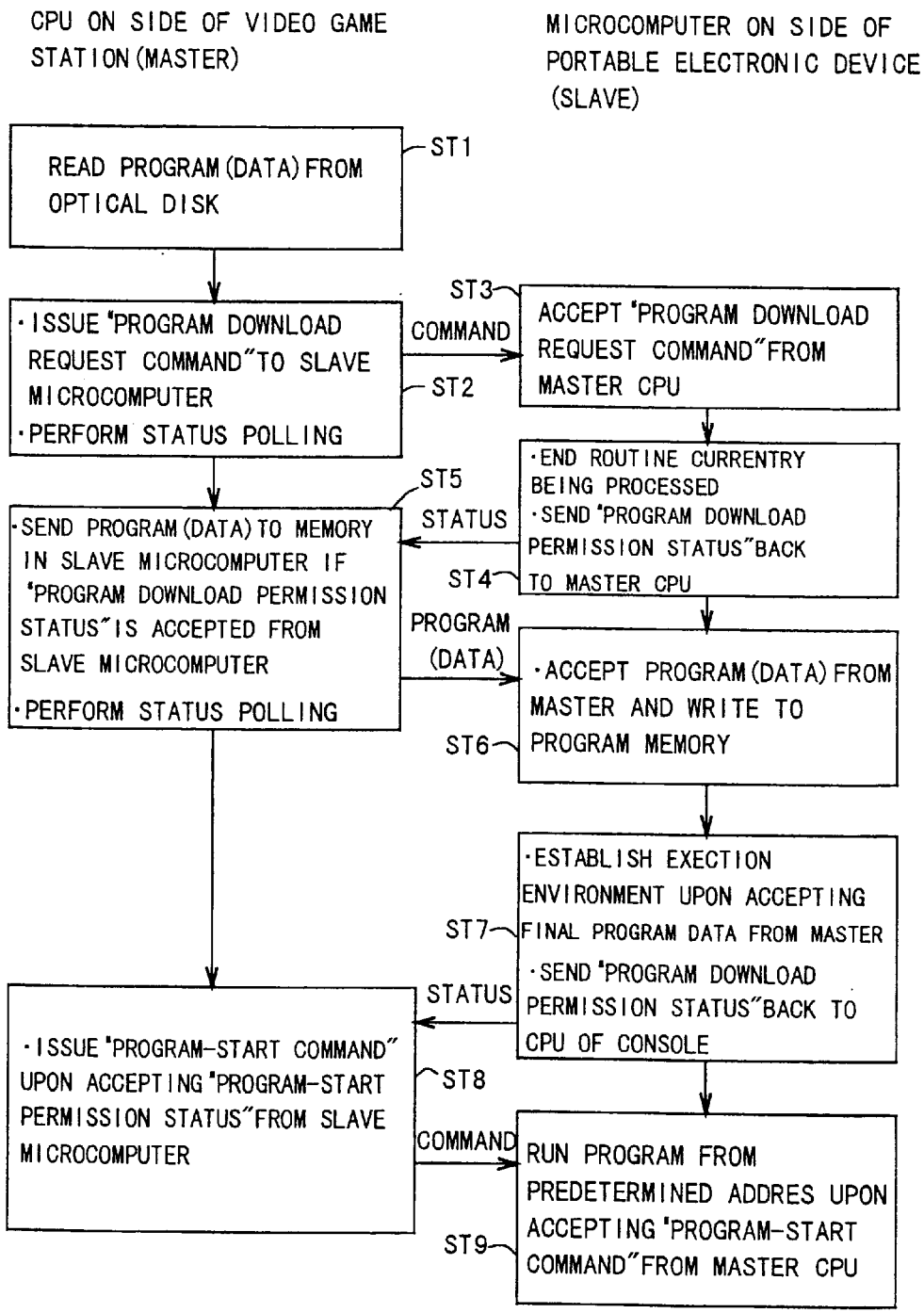
FIG. 13 is a flowchart showing the download procedure of FIG. 12.

FIG. 13 illustrates the download procedure of FIG. 12.

At step ST1, the application program of a video game that runs on the microcomputer 41 in the slave portable electronic device 100 (referred to simply as the "slave" hereafter) is read as data out of the CD-ROM that has been mounted on the disk mounting unit 3 of the master video game station 1 (referred to simply as the "master" hereafter). As mentioned earlier, this application program generally is different from that which runs on the master video game station 1.

Next, at step ST2, the CPU 51 serving as the control means of the master issues a "program download request command" to the microcomputer 41 serving as the control means of the slave portable electronic device 100. The CPU 51 performs polling in order to accept "program download permission status" from the microcomputer 41. The polling mentioned here refers to a method of performing a service upon inquiring as to whether the service has been requested or not.

The microcomputer 41 of the portable electronic device 100 serving as the slave accepts the "program download request command" from the CPU 51 of the master at step ST3.

When the microcomputer 41 on the slave side ends the routine currently being processed and a state in which program download can be executed is attained, the microcomputer sends "program download permission status" back to the CPU 51 of the master at step ST4.

Next, upon accepting "program download permission status" from the microcomputer 41 on the slave side at step ST5, the CPU 51 of the master transfers (downloads) and writes the program, which was read out of the CD-ROM at step ST1, to the program memory 41a serving as the program storage means of portable electronic device 100. The CPU 51 performs polling in order to accept "program-start permission status" from the microcomputer 41.

The address of the program memory 41a to which the downloaded data is 10 written is managed by the microcomputer 41 of the slave at this time. In the description rendered above, a case in which the program downloaded from the master is stored in the program memory 41a within the microcomputer 41 is taken as an example. However, an arrangement may be adopted in which the program is stored in a storage device such as an SRAM that is capable of inputting and outputting data at high speed.

The microcomputer 41 of the memory card accepts as data the program that has been transferred from the master and writes this data to the program memory 41a at step ST6. From the point of view of the CPU 51 of the master, it appears that the program data is being written directly to the program memory 41a of the portable electronic device 100 serving as slave. In addition, the address of the program memory 41a is managed by the microcomputer 41.

Upon accepting the final program data from the master and then establishing an environment in which the program can be executed, the microcomputer 41 of the portable electronic device 100 sends "program-start permission status" back to the CPU 51 of the console at step ST7.

The CPU 51 of the master accepts "program-start permission status" from the microcomputer 41 of the portable electronic device 100 and issues a "program-start command" at step ST8.

Upon receiving the "program-start command" from the CPU 51 of the master, the microcomputer 31 of the portable electronic device 100 starts running the program from a predetermined starting address.

By way of the foregoing procedure, the application program is transferred directly (downloaded) from the master video game station 1 to the program memory 41a in the microcomputer 41 of the portable electronic device 100 serving as the slave that has been inserted.

As mentioned above, the means which supplies the application program is not limited to a storage medium such as the optical disk, and an arrangement in which it is supplied via a communication line may be adopted. Only step ST1 would differ in the above-described procedure in such case.

It should be noted that the foregoing download procedure has been described for a case where the application program is downloaded directly from the video game station 1 of the master to the program memory 41a in the microcomputer 41 of serving as the control means of the portable electronic device 100 slave that has been inserted.

By contrast, there is also a case where the CPU 51 of the master downloads the data of an application program to the non-volatile memory 46 in the slave portable electronic device 100, after which this data is copied to the program memory 41a in the microcomputer 41, where the program is then executed.

Figure 14:
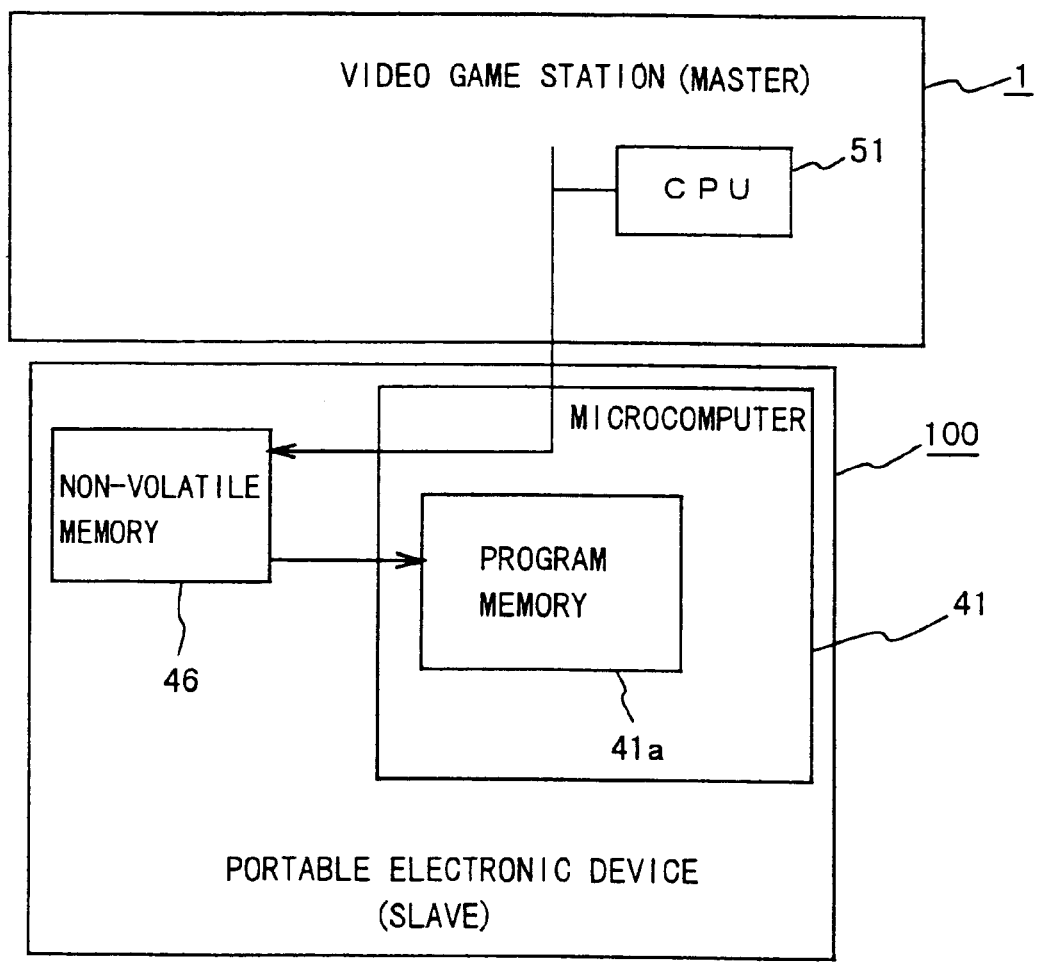
FIG. 14 is a diagram showing another flow of program data downloaded from the video game station console (master) to the portable electronic device (slave)

FIG. 14 illustrates the flow of data in such case. Specifically, the application program of a video game supplied from an optical disk or the like mounted on the disk mounting unit 3 of the master video game station 1 is transferred (downloaded) to the non-volatile memory 46 in the portable electronic device 100 serving as the slave via the CPU 51 serving as the control means of the video game console 1, after which the program is copied to the program memory 41a in the microcomputer 41 as the control means and executed.

Figure 15:
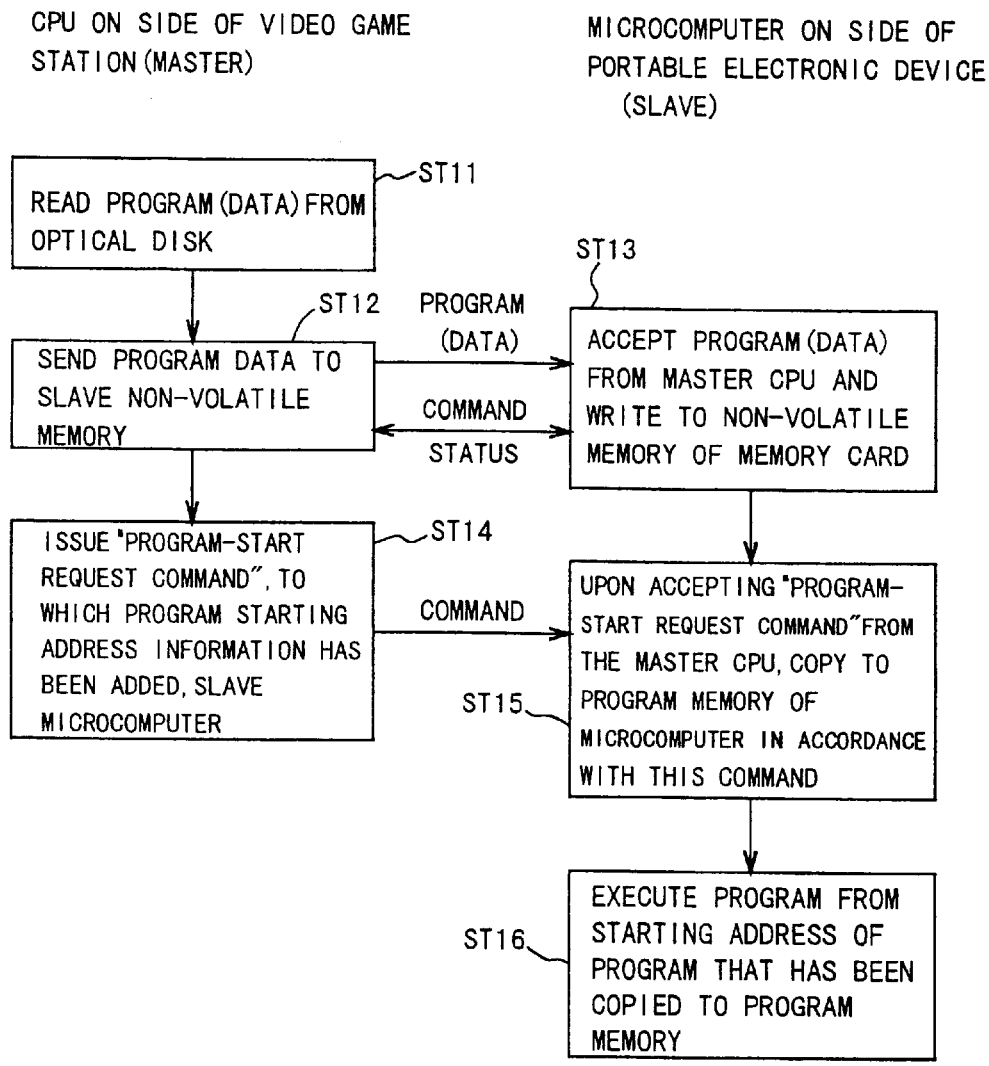
FIG. 15 is a flowchart showing the procedure of the download depicted in FIG. 14.

FIG. 15 illustrates the download procedure.

At step ST11, the application program of a video game that runs on the microcomputer in the portable electronic device 100 serving as the slave is read as data out of the CD-ROM that has been mounted on the disk mounting unit 3 of the video game station 1 serving as the master.

Next, at step ST12, the CPU 51 of the master transfers (downloads) the program data read out of the CD-ROM to the non-volatile memory 46 of the portable electronic device 100 serving as the slave. This procedure is similar to that of the case where data is backed up in the conventional video game station.

Next, at step ST13, by means similar to that for conventional data backup, the microcomputer 41 serving as the control means of the portable electronic device 100 accepts as data the application program that has been transferred from the CPU 51 of the master and writes this data to the non-volatile memory 46.

This is followed by step ST14 where, upon receiving a "program-start request command" from the CPU 51 of the master, the microcomputer 41 of the portable electronic device 100 copies data of a designated size from an address of the non-volatile memory 46 designated by the above-mentioned command to the program memory 41a in the microcomputer 41.

The microcomputer 41 of the portable electronic device 100 executes the program, which was copied to the program memory 41a, from the starting address of this memory.

By way of the foregoing procedure, the program of the application software is transferred (downloaded) as data, via the non-volatile memory 46, from the master video game station 1 to the program memory 41a in the microcomputer 41 of the portable electronic device 100 that has been inserted.

It should be noted that the application program downloaded from the video game station 1 to the portable electronic device 100 generally is different from that which runs on the master video game station 1. Of course, the above-mentioned downloaded application program may be one that runs on both the video game station 1 and the portable electronic device 100. In such case, however, a constraint imposed is that the CPU on the side of the video game station 1 and the microcomputer on the side of the portable electronic device 100 be identical processors.

Described next will be cooperative operation performed while the application software that has been downloaded from the master video game station 1 through the foregoing procedure is executed in the slave portable electronic device 100 independently and the result of execution is again exchanged with the video game station 1.

Here attribute data of personages or characters that appear in a so-called role-playing game that runs on the video game station 1 of the master is downloaded to the portable electronic device 100 of the slave. The attribute data is data that represents extent of growth, personality, etc.

By nurturing the appearing personages or characters in the program executed by the microcomputer 41 within the slave portable electronic device 100, the attributes thereof are caused to change independently of the program executed by the console of the video game station 1 serving as the master.

The portable electronic device 100 embodying the present invention is configured so as to operate independently and, moreover, is small in size and convenient to carry about. As a result, the personages and characters that make an appearance owing to the program run on the portable electronic device 100 can be carried about and nurtured by the user (the player of the game) at any time. The attributes of the appearing personages and characters nurtured under the care of the user can also be transferred (uploaded) from the portable electronic device 100 to the console of video game station 1 by the user. In this case the appearing personages and characters whose attributes have been changed can be incorporated in the program being run on the master video game station 1 and made to act in the program.

Thus, as described above, it is possible to implement a video game in which cooperative operation can be carried out by sharing the attribute data of personages and the like with both the video game station 1 constituting the master and portable electronic device 100 constituting the slave and by causing the attribute to change in each of these devices.

Next, a game played using the above-mentioned video game station 1 serving as the master and the portable electronic device 100 serving as the slave will be described in detail. For the sake of simplicity, the video game station 1 shall be referred to simply as the "master" and the portable electronic device 100 as the "slave" below.

Described next will be an electrical system in which an internal device can give rise to an event in a slave.

When an event occurs in an internal device in a slave, the fact that the event occurred is stored and then the event occurrence is communicated to the master in response to a request from the master. As a result, the origin of an operation is not only the master but can also be an internal device.

Further, an external device also can be the origin of an operation through the intermediary of an internal device, namely infrared communication.

For example, when the infrared receiver of the slave receives infrared radiation, a so-called residence section, which is a program for sensing this fact, senses the fact of reception and sends the response to the master as status.

If an event has occurred on the slave side, the slave also sends the status back to the master. However, status cannot be sent back unless there is a status-request command from the master. Accordingly, it is required that monitoring be performed continuously between the slave and the master using a status-request command. Outwardly, however, it appears that status is being sent automatically.

The slave is given the capability of providing a command for investigating whether or not an event has occurred. By calling this command repeatedly, the circumstances of event occurrence can be monitored. If an event has occurred, the event is acquired and various operations are performed depending upon the content of the event.

In response to the command, any operation can be started from the slave side, whereas heretofore a reaction only was made to a command from the master.

Items that can give rise to events in the slave are accessory devices such as an infrared block, speaker, microphone and clock, as well as programs running on the slave. The fact that these accessory devices and programs wish to make something happen can be communicated to the master.

Examples of methods of use are "Want to do . . . when the time becomes . . .", "If a voice is sensed, then . . ." and "If . . . is received by infrared communication from another slave, then . . .", etc.

Figure 16:
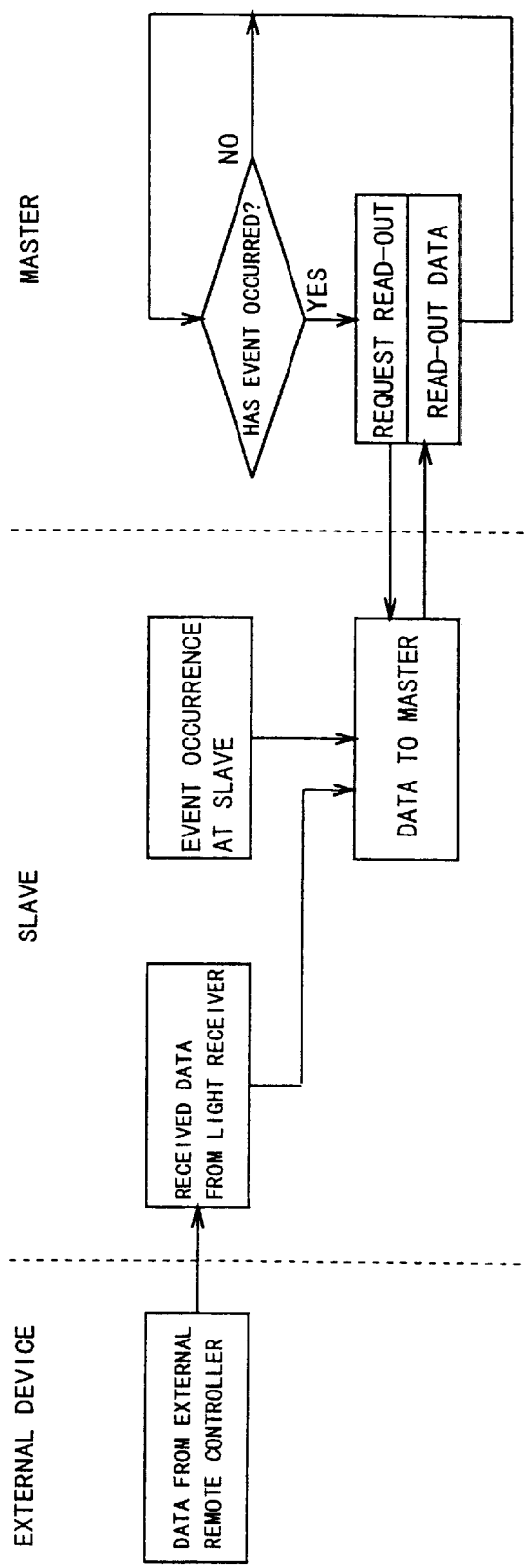
FIG. 16 is a block diagram schematically illustrating mode of communication between a slave and a master.

The relationship set forth above will be described with reference to the block diagram shown in FIG. 16.

Data from an external remote controller constituting an external device is received data from a light receiver in the slave. This becomes data to the master. Occurrence of an event within the slave also becomes data to the master and is read out by the master.

That is, when these events occur, a "YES" decision is rendered in regard to event occurrence and event-occurrence steps are executed. A read-out request is issued to the slave and data to the master is read out of the slave as read-out data.

In a case where an event of the above-mentioned type does not occur, a "NO" decision is rendered in the master in regard to event occurrence and event-occurrence processing is not executed.

Figure 17:
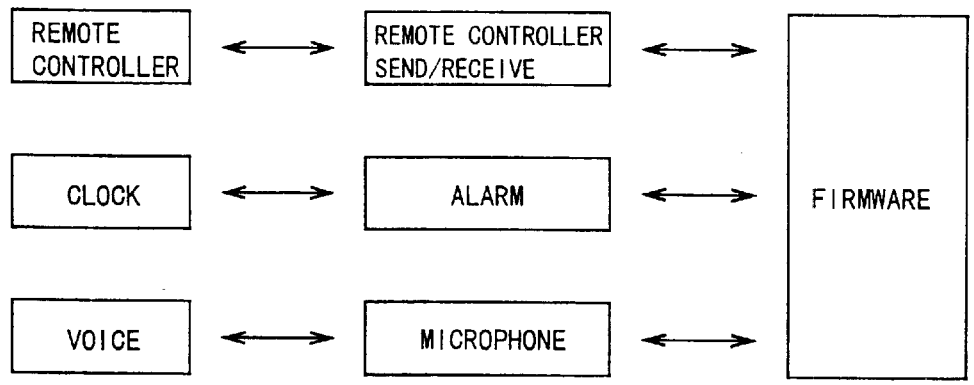
FIG. 17 is a block diagram schematically illustrating a protocol relating to event-occurrence factors.

A protocol relating to event-occurrence factors will be described with reference to FIG. 17.

Remote control, clock and voice can be mentioned as examples of event-occurrence factors. These are communicated to the firmware of the slave.

More specifically, remote control, clock and voice are sent to the firmware on the slave side via the transceiver of a remote controller, alarm and microphone, respectively.

Figure 18:
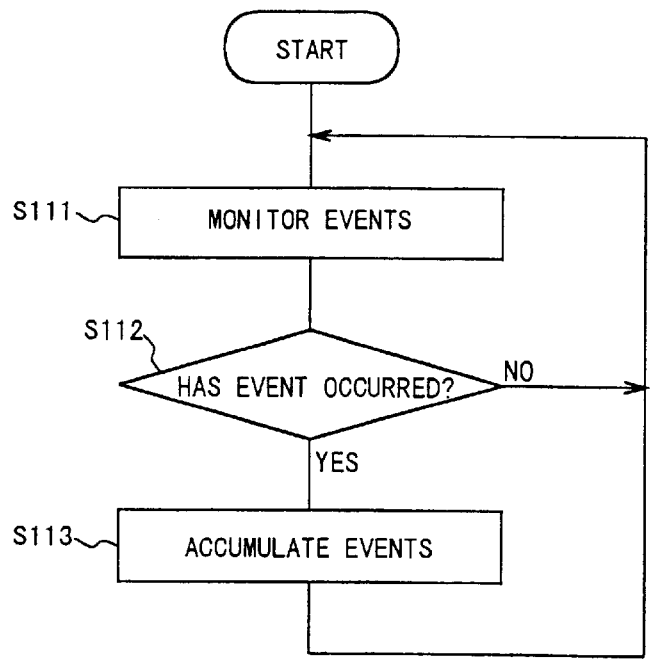
FIG. 18 is an example of the firmware of the slave.

An example of steps in the firmware of the slave will be described with reference to a flowchart illustrated in FIG. 18.

Events are monitored at step S1 by communication of event-occurrence factors. Event occurrence is monitored at the next step S112. A "YES" decision is rendered and control proceeds to step S113 if an event has occurred, and a "NO" decision is rendered and control returns to step S111 if an event has not occurred.

Events are accumulated at step S113. Control then returns to step S111.

Figure 19:
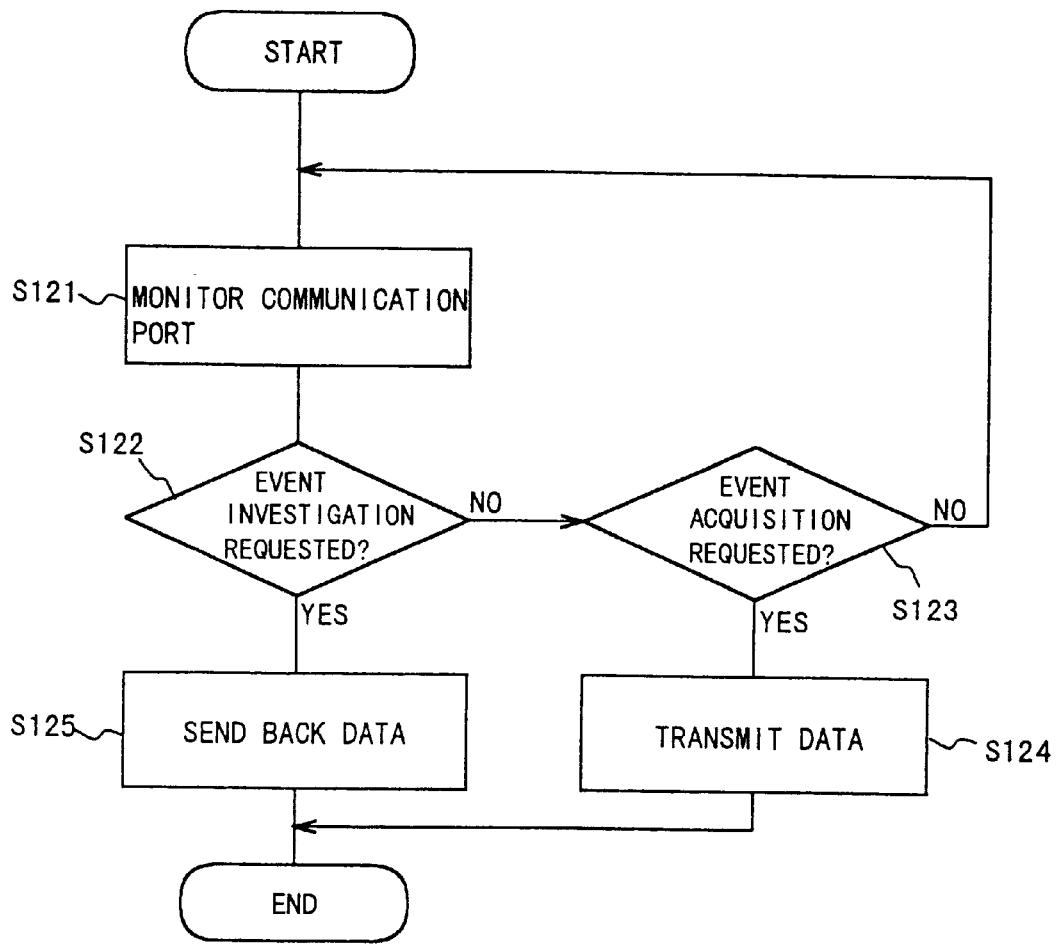
FIG. 19 is another example of the firmware of the slave.

Another example of steps in the firmware of the slave will be described with reference to a flowchart shown in FIG. 19.

A communication port is monitored at an initial step S121 in regard to communication from the master. Control then proceeds to step S122.

Processing branches at step S122 in dependence upon the communication from the master. Specifically, a "YES" decision is rendered and control proceeds to step S125 if communication from the master is an event request, and a "NO" decision is rendered and control proceeds to step S123 otherwise.

Event-accumulation information is transmitted to the master at step S125 and then this series of steps is exited.

Processing branches at step S123 in dependence upon whether communication from the master is an event acquisition request. Specifically, a "YES" decision is rendered and control proceeds to step S124 if the communication from the master is an event acquisition request, and a "NO" decision is rendered and control proceeds to step S121 otherwise.

The content of the event is transmitted to the master at step S124 and then this series of steps is exited.

Figure 20:
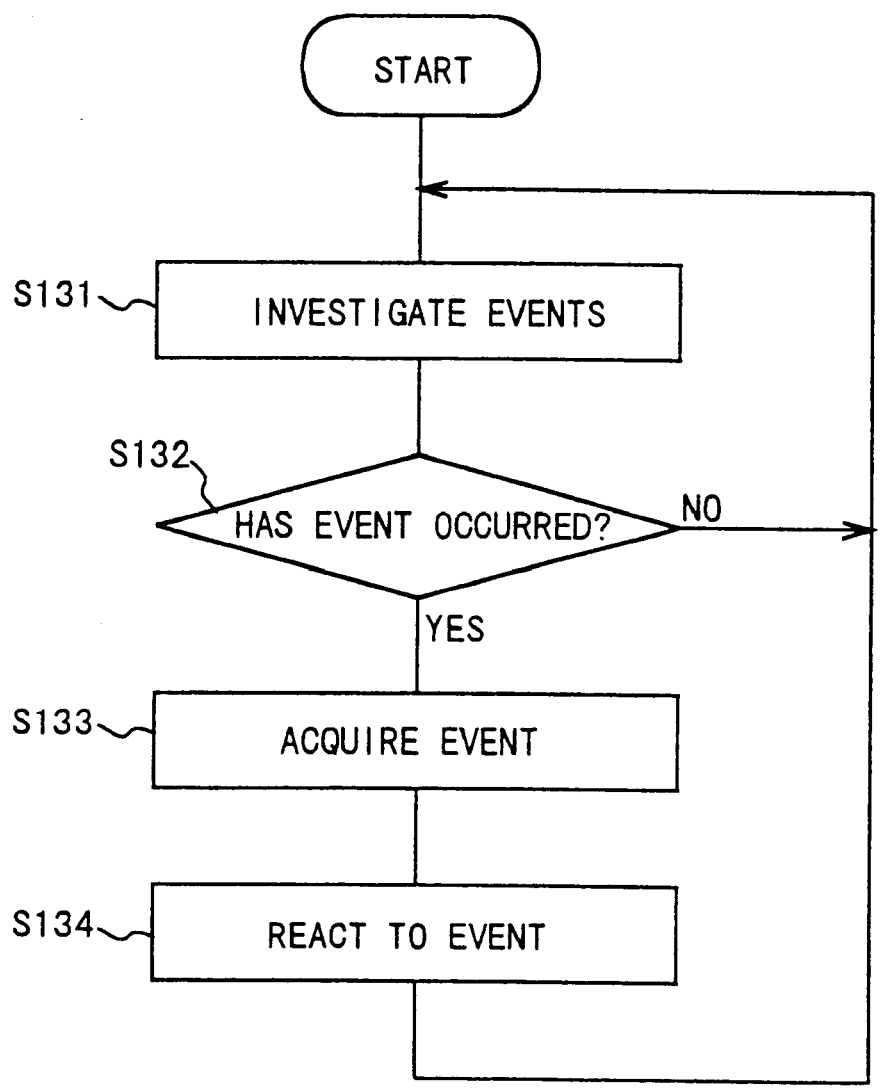
FIG. 20 is a flowchart illustrating a series of steps executed on the side of a master.

A series of steps on the master side will be described with reference to FIG. 20.

An event investigation is performed at an initial step S131 by communication with the slave. Control then proceeds to step S132.

Processing branches at step S132 depending upon whether there is an event or not. Specifically, a "YES" decision is rendered and control proceeds to step S133 if there is an event, and a "NO" decision is rendered and control returns to step S131 if there is no event.

An event is acquired by communication with the slave at step S133 and the event is reacted to at step S134. Control then returns to step S131.

Communication based upon the conventional protocol will now be described in brief for the purpose of comparison with the mode described above. As shown in FIG. 21, steps on the slave side include monitoring a communication port in regard to data from the master at step S145. Control then proceeds to step S142.

Processing branches at step S142 in regard to whether the master issued a read-out request. Specifically, a "YES" decision is rendered and control proceeds to step S144 if the master issued a read-out request, and a "NO" decision is rendered and control proceeds to step S143 if the master did not issue a read-out request.

Processing branches at step S143 depending upon whether the master has issued a write request. Specifically, a "YES" decision is rendered and control proceeds to step S145 if the master issued a write request, and a "NO" decision is rendered and control returns to step S141 if the master did not issue a write request.

The slave sends data back to the master at step S144. Control then returns to step S141.

Data from the master is received at step S145. Control then returns to step S141.

The communication protocol on the master side will be described with reference to FIG. 22.

In case of data read-out, the master sends a data request to the slave and received data sent from the slave as a result of the data request, as shown at A in FIG. 22.

In case of data write, as shown at B in FIG. 22, the master interrogates the slave in regard to whether data communication is allowed. If data communication has been allowed, the master transmits the data to the slave.

A protocol used in relation to the above-described communication between the master and the slave will now be set forth in detail.

The protocol name is defined first. The protocol used in communication between the master and the slave is referred to as a "controller protocol", abbreviated here to "CP". Further, a protocol that accepts only 00 as the master command of the fourth byte is referred to as CP 1.0, and a protocol in which 01 to 03 commands also can be interpreted in addition to 00 is referred to as CP 2.0.

When a read operation is performed, CP 1.0 is as indicated in Table 1 below.

TABLE 1

| CP 1.0 READ | | | | | | | |
|---|---|---|---|---|---|---|---|
| | 1 | 2 | 3 | 4 | 5 | 6 | 7 |
| MASTER | 81 | 52 | 00 | 00 | SecH | SecL | 00 |
| SLAVE | zz | Stat | 5A | 5D | 00 | 00 | 5C |
| | 8 | 9 | 10 | 11 | 12 | ... | |
| MASTER | 00 | 00 | 00 | 00 | 00 | ... | |
| SLAVE | 5D | SecH | SecL | d0 | d1 | ... | |

When a write operation is performed, CP 1.0 is as indicated in Table 2 below.

TABLE 2

| CP 1.0 WRITE | | | | | | | |
|---|---|---|---|---|---|---|---|
| | 1 | 2 | 3 | 4 | 5 | 6 | 7 |
| MASTER | 81 | 57 | 00 | 00 | SecH | SecL | 00 |
| SLAVE | zz | Stat | 5A | 5D | 00 | 00 | 5C |
| | 8 | 9 | 10 | 11 | 12 | ... | |
| MASTER | 00 | d0 | d1 | d2 | d3 | ... | |
| SLAVE | 5D | 00 | 00 | 00 | 00 | ... | |

Here "zz" represents high-impedance or undefined, "Stat" represents memory-card status, and "SecH" and "SecH" represent sector-number high and sector-number low, respectively.

The special-purpose protocol CP 2.0 is as indicated in Table 3 below.

TABLE 3

| CP 2.0 Special-Purpose Protocol | | | | | | | | |
|---|---|---|---|---|---|---|---|---|
| | 1 | 2 | 3 | 4 | 5 | 6 | 7 | 8 ... |
| MASTER | 81 | 52/57 | Cmd | 00 | 00 | tx1 | tx2 | tx3 ... |
| SLAVE | zz | Stat | 5A | 5D | Size | rx1 | rx2 | rx3 ... |
| | | | | | | ← Size Byte → | | |

In Table 3, "52", which is the value of the second byte of the master, represents read-out, and "57" represents write.

Here data length prepared by the memory card is sent by "Size" on a per-command basis, and communication is terminated with tx(n)/rx(n) succeeding the [size] byte.

As for the command "Cmd", "01", "02", "03 and "04" represent memory card information, save-context read/write, memory-card-accessory device information acquisition and memory-card-accessory device read/write, respectively.

Communication content when each command is executed is indicated below. Slave information is indicated in Table 4 below. This content is read-only content.

TABLE 4

| READ ONLY | | | | | | | | |
|---|---|---|---|---|---|---|---|---|
| | 1 | 2 | 3 | 4 | 5 | 6 | 7 | 8 |
| MASTER | 81 | 52 | 01 | 00 | 00 | xx | xx | xx |
| SLAVE | zz | Stat | 5A | 5D | 0A | rev | sn3 | sn2 |

TABLE 4-continued

READ ONLY

|  | 9 | 10 | 11 | 12 | 13 | 14 | 15 |
|---|---|---|---|---|---|---|---|
| MASTER | xx | xx | xx | xx | xx | xx | xx |
| SLAVE | sn1 | sn0 | blk1 | blk0 | alt1 | alt0 | dev |

Here "rev" represents a firmware revision code of a slave. For example, we ave "01" in regard to CP 2.0 rev 1.0.

Further, "sn3" to "sn0" represent memory-card serial numbers, and "blk1" to "blk0" represent numbers of storable blocks. It should be noted that one block is equivalent to 8 kilobytes.

In addition, "alt1" to "alt0" represent numbers of alternative sectors, and "dev" stands for numbers of accessory devices of a memory card.

Read/write of save context will be described next. Protocol relating to save context is as shown in Table 5 when read-out is performed and as shown in Table 6 when write is performed.

TABLE 5

READ

|  | 1 | 2 | 3 | 4 | 5 | 6 | 7,8 |
|---|---|---|---|---|---|---|---|
| MASTER | 81 | 52 | 02 | 00 | 00 | xx | xx |
| SLAVE | zz | Stat | 5A | 5D | 03 | run | top |

TABLE 6

WRITE

|  | 1 | 2 | 3 | 4 | 5 | 6 |
|---|---|---|---|---|---|---|
| MASTER | 81 | 57 | 02 | 00 | 00 | run |
| SLAVE | zz | Stat | 5A | 5D | 17 | 00 |

|  | 7,8 | 9–12 | 13–16 | 17–20 | 21–24 | 25–28 |
|---|---|---|---|---|---|---|
| MASTER | top | Stat | arg1 | arg2 | arg3 | arg4 |
| SLAVE | 00 | 00 | 00 | 00 | 00 | 00 |

Here "run" represents a state immediately preceding a master mode or a state to which a shift is made after the master mode has been exited. That is, "0", "1", "2" and "3" represent sleep, clock display, "resume" state immediately preceding master mode, and execution of memory-card application from designated address, respectively.

Further, "top" stands for the block number at which the beginning of an application has been executed or will be executed, "start" represents the address at which execution is started after the master mode is exited, i.e., the address after re-disposition of a memory management unit (MMU), and "arg1" to "arg4" indicate arguments delivered when an application starts being executed. It should be noted that the arguments are substituted into registers that are used as arguments.

A protocol used in acquisition of device information belonging to a slave is as indicated in Table 7 below. The protocol used in device information acquisition is read-only.

TABLE 7

READ ONLY

|  | 1 | 2 | 3 | 4 | 5 | 6 | 7 |
|---|---|---|---|---|---|---|---|
| MASTER | 81 | 52 | 03 | 00 | 00 | xx | xx |
| SLAVE | zz | Start | 5A | 5D | 02 | dev | size |

Here "dev" represents the device category number and "size" stands for the size of data read from and written to a device. That is, "0" represents 128 bytes fixed, "1" to "127" represent size byte fixed, and "−1" to "−128" represent 1 to (−size) bytes variable.

Device names and data structures are as indicated in Table 8 below.

TABLE 8

| NO. | DEVICE NAME | DATA STRUCTURE |
|---|---|---|
| 1 | CLOCK | DATE; TIME; DAY OF WEEK |
| 2 | INFRARED REMOTE CONTROLLER | 1–128 BYTE VARIABLE-LENGTH DATA |
| 3 | SPEAKER/MICROPHONE 4-BIT PCM DATA | 128 BYTES (256 SAMPLES) FIXED |
| 4 | DTMF FOR BUZZER | FREQUENCIES 1, 2; 2 BYTES EACH; OSCILLATION TIME: 1 BYTE |
| 5 | LCD BACKLIGHTING | 0: OFF, 1: ON |
| 6 | LOW BATTERY VOLTAGE DETECT | 0: VOLTAGE LOW, 1: VOLTAGE NORMAL |

Specifically, numbers "1", "2", "3", "4", "5" and "6" correspond to clock, infrared remote controller, speaker/microphone 4-bit PCM data, DTMF for a buzzer, LCD backlighting and detection of low battery voltage, respectively.

A protocol used in read/write of accessory devices of a slave are as indicated in Tables 9 and 10 below.

TABLE 9

READ

|  | 1 | 2 | 3 | 4 | 5 | 6 | 7 | 8 |
|---|---|---|---|---|---|---|---|---|
| MASTER | 81 | 52 | 01 | dev | 00 | xx | xx | ... |
| SLAVE | zz | Stat | 5A | 5D | 80 | rx1 | rx2 | ... |

TABLE 10

WRITE

|  | 1 | 2 | 3 | 4 | 5 | 6 | 7 | 8 |
|---|---|---|---|---|---|---|---|---|
| MASTER | 81 | 57 | 01 | dev | size | tx1 | tx2 | ... |
| SLAVE | zz | Stat | 5A | 5D | 80 | 00 | 00 | ... |

Here "dev" represents the device category number, "rx1" represents read-out data, "tx1" stands for write data, and "size" denotes desired write data size. The desired write data size is valid only when data is of variable length data.

A so-called infrared protocol, in which infrared radiation is used as the transmission medium, can be utilized in actual communication of the foregoing protocol. This infrared remote-controller protocol will now be described.

A transmission-in-progress flag and a reception-in-progress flag are examples of commands provided in order to send and receive data.

With regard to an Info request, i.e., an information request, used in this infrared protocol, when a mask is applied as mode of use, device type and serial number and an Info request command is issued, the devices corresponding to this mask respond in unison and send back information.

Examples of the information sent in response at this time are mode of use, namely whether the device is being used independently, whether the device has been connected to the controller terminal of the master, to the memory card terminal of the master or the SIO terminal of the master, device type, namely master, slave or infrared transceiver, and serial number, firmware revision number and accessory device.

If there is a device that has started responding previously, a new response is awaited until this response ends.

In order to arrange it so that sound will not be emitted endlessly in response to interruption of a signal during operation, it is always arranged so that operating time can be set in regard to a device that does not shut down automatically.

Next, a distinction between programs and data will now be described.

An execution program can be read/written by a command "00" in the same manner as data. Data and programs are distinguished from each other as follows:

The initial block of a memory card is a FAT, and there is a 128-byte data area for each block. However, since only 32 bytes are used at the present time, new information is added to a vacant area.

Since read/write of a portion that exceeds 32 bytes cannot be carried out with the current library, a program identification flag cannot be set except for data (copied by OSD) written directly from a game disk.

If it is assumed that a flash memory portion is equipped with an MMU, information that is added on is real address information and a program/data identification flag.

If the MMU cannot be attached, then what is executed is only the continuous program that starts from block 1. "Real address information", therefore, is unnecessary, but it is necessary to provide a garbage collection function in the firmware in order to make the area from block 1 vacant. The reason for this is that transferring data by communication with the master is too slow.

If an alternative sector is being used, the codes of the application will no longer be continuous. Accordingly, this cannot be used as an area accessed by an application. When the codes of an application cannot be written to this block or codes cannot be written in completely because of inadequate capacity, an indication of this fact must be given. In order to prevent write failure due to the service life of the flash memory even in a state in which an application has been left written in, it is necessary to subject the data area to a write check periodically.

Thus, a command for investigating whether an event has occurred is provided in a slave. By calling this command repeatedly, the circumstances of event occurrence can be monitored.

If an event has not occurred, the command for monitoring this event is called again. If an event has occurred, this event is acquired and various operations are performed depending upon the content of the event.

In response to the command, any operation can be started from the side of the memory card, whereas heretofore a reaction only was made to a command from the master.

Items that can give rise to events in the slave are "accessory devices" such as an "infrared communication block, speaker, microphone and clock", as well as programs running on the memory card. The fact that these themselves wish to make something happen can be communicated to the master.

Examples of methods of use are "Want to do . . . when the time becomes . . ." and "If a voice is sensed, then . . .", etc.

Described next will be direct start-up of a program on a recording device using a FAT system undergoing address mapping.

Figure 23:
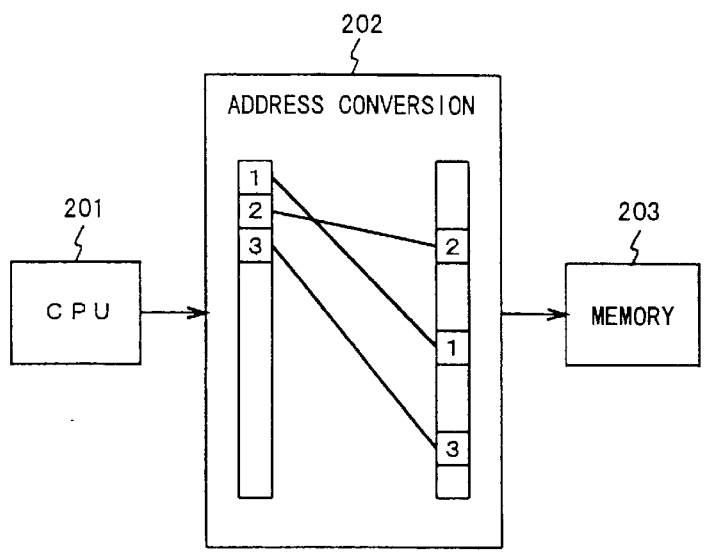
FIG. 23 is a block diagram schematically illustrating address conversion of a memory.

Direct start-up of a program in this recording device is such that when a memory 203 is operated from a CPU 201, as illustrated in FIG. 23, non-consecutive name addresses are shown consecutively by performing an address conversion 202 using a file allocation table (FAT).

By converting the addresses of blocks 1, 2 and 3, which are arranged non-consecutively in memory, in the address converter 202, they are made to appear as consecutive blocks 1, 2 and 3 to the CPU 201.

These blocks are prescribed units of stored information in the memory 203.

Figure 24:
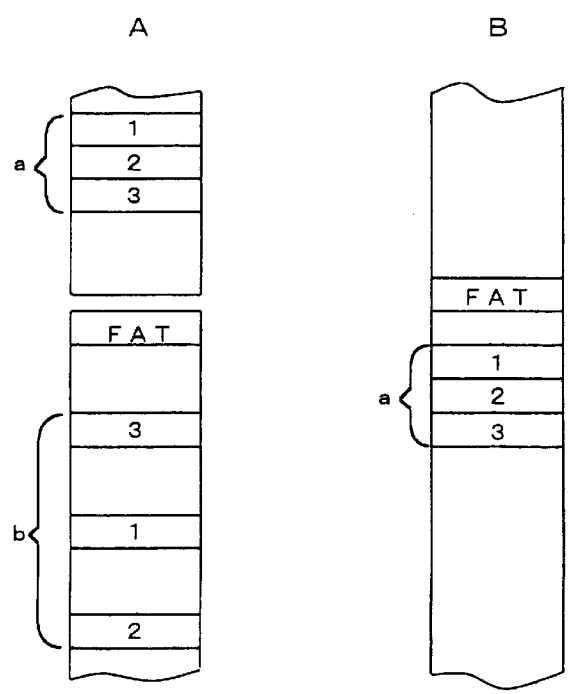
FIG. 24 is a diagram showing an array of memory blocks at time of execution.

By performing the address conversion using this FAT system, blocks are arranged consecutively in apparent terms as shown at a in B of FIG. 24 when a program is executed. As a result, the program can be executed as is. Heretofore, blocks arranged non-consecutively as shown at k in A of FIG. 24 where rearranged consecutively as shown at a in FIG. 24.

Figure 25:
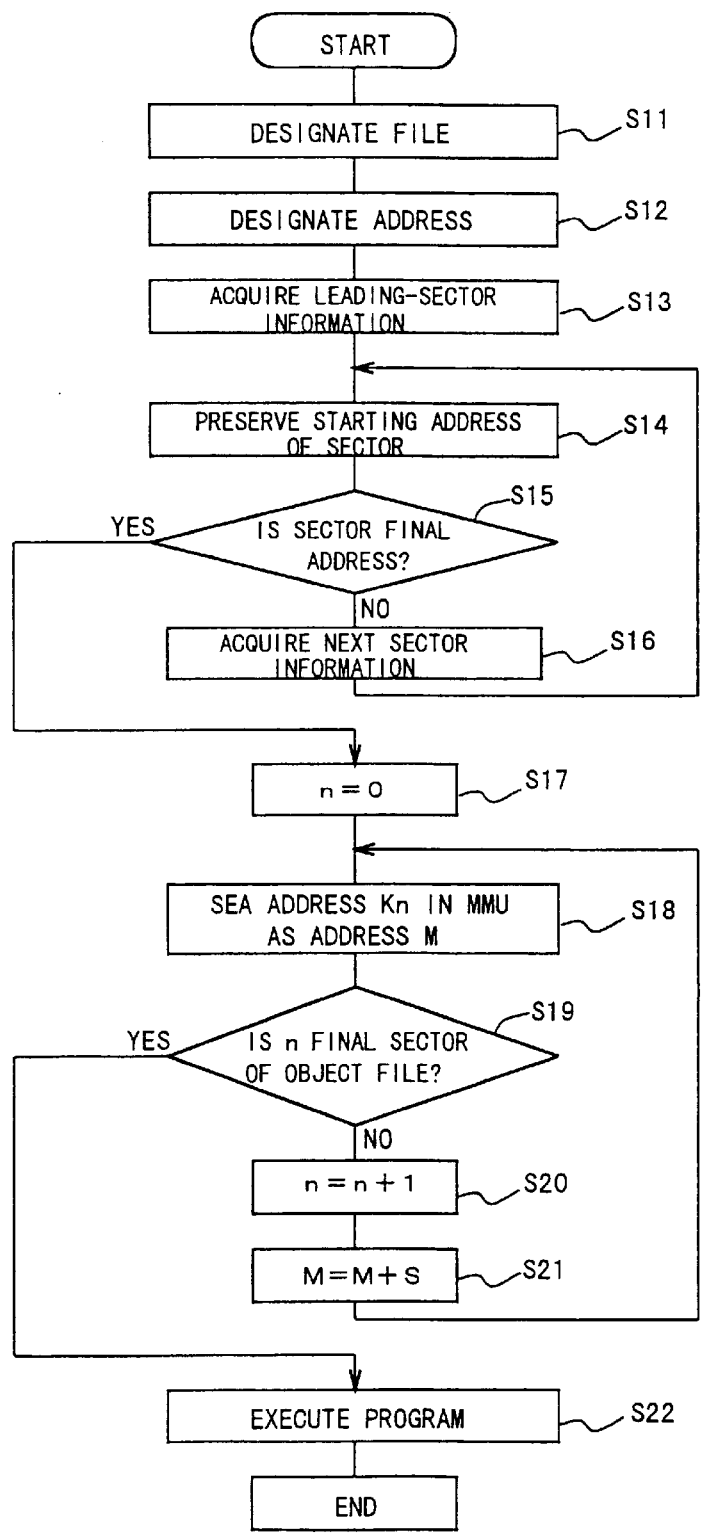
FIG. 25 is a flowchart illustrating a series of steps of address conversion.
Figure 26:
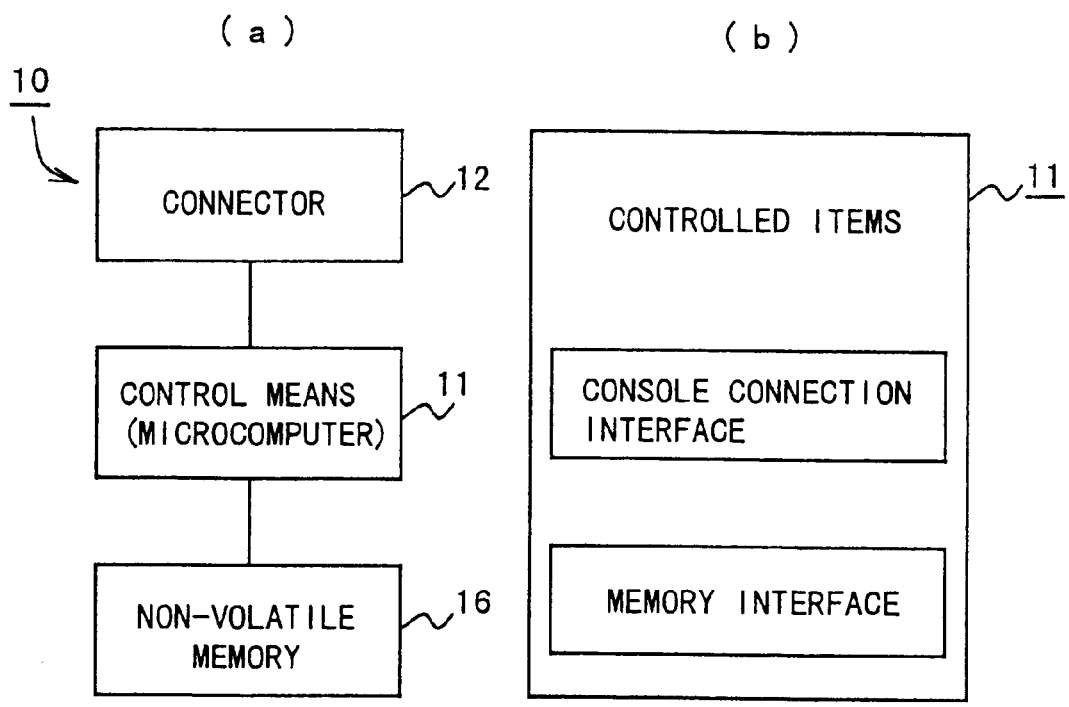
FIG. 26 is a diagram showing an example of the arrangement of the principal components of a conventional memory card.
Figure 27:
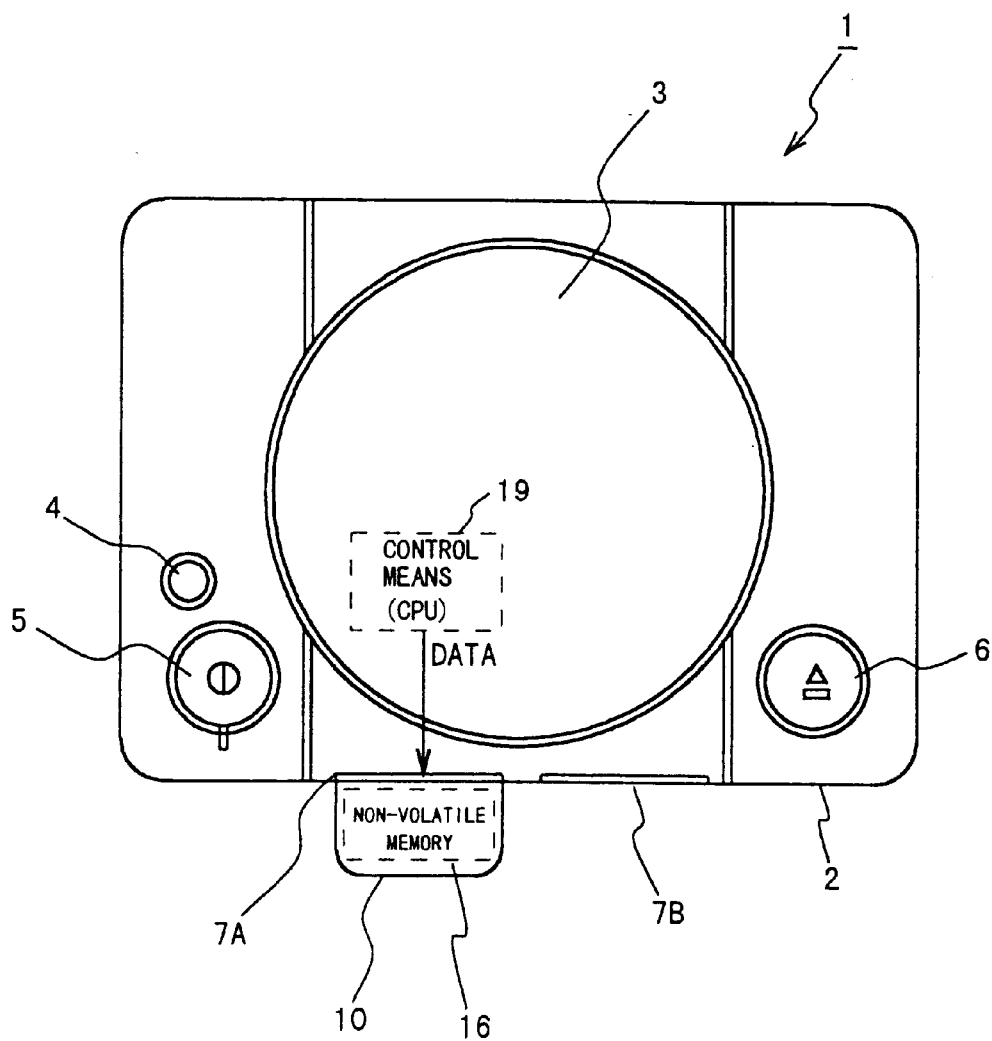
FIG. 27 is a diagram showing an example of a video game station using a memory card as an auxiliary storage device.

A series of steps regarding this address conversion will be described with reference to a flowchart shown in FIG. 25.

A file is designated at an initial step S11, an address is designated at step S12, the leading sector information is acquired at step S13 and the starting address of the sector is preserved at step S14. Control then proceeds to step S15.

Processing branches at step S15 depending upon whether the sector is the final address. Specifically, a "YES" decision is rendered and control proceeds to step S17 if the sector is the final address, and a "NO" decision is rendered and control proceeds to step S16 if the sector is not the final address.

The information of the next sector is acquired at step S16. Control then proceeds to step S14.

The setting n=0 is made at step S17, and an address Kn is set in an MMU as an address M at step S18. Control then proceeds to step S19.

Processing branches at step S19 in dependence upon whether n is the final address. Specifically, a "YES" decision is rendered and control proceeds to step S22 if n is the final address of the object file, and a "NO" decision is rendered and control proceeds to step S20 otherwise.

The setting n=n+1 is made at step S20, and the setting M=M+S is made at step S21. Control then proceeds to step S18.

A program is executed at step S22 and then this series of steps is exited.

It should be noted that direct execution of a program in memory by the address conversion in the above-described FAT is usually carried out in the slave. However, this does not impose a limitation upon the present invention. For example, the present invention can be utilized in ordinary information equipment as well.

What is claimed is:

1. A portable entertainment device equipped with an interface for making a connection to a master capable of executing an entertainment program, characterized by comprising:

program storage means for storing an entertainment program downloaded from a memory device storing entertainment programs in said master, said downloaded entertainment program being different from that which runs on said master;

control means for controlling execution of said downloaded entertainment program independently from the execution by said master; and conversion means for converting an address of said downloaded entertainment program, which has been stored in said program storage means, with respect to said control means;

wherein said control means directly executes said downloaded entertainment program, whose address has been converted by said conversion means, stored in said program storage means.

2. The portable entertainment device according to claim 1, characterized by further comprising wireless communications means for sending and receiving data to and from another device.

3. The portable entertainment device according to claim 1, characterized in that the connected master is a video game station, and said downloaded entertainment program that has been stored in said program storage means is executed based upon information from the connected master.

4. An entertainment system comprising a master capable of executing an entertainment program and a slave equipped with an interface for making a connection to the master, characterized in that:

said master has control means for transferring information accompanying execution of said entertainment program to said slave and for reading in information from the slave; and said slave has:

program storage means for storing an entertainment program downloaded from a memory device storing entertainment programs in said master, said downloaded entertainment program being different from that which runs on said master;

control means for controlling execution of said downloaded entertainment program independently from the operation of said master; and conversion means for converting an address of said downloaded entertainment program, which has been stored in said program storage means, with respect to said control means;

wherein said control means directly executes said downloaded entertainment program, whose address has been converted by said conversion means, stored in said program storage means.

5. The entertainment system according to claim 4, characterized in that the connected master is a video game station, and said downloaded entertainment program That has been stored in said program storage means is executed based upon information from the connected master.

* * * * *